US007023495B2

(12) United States Patent
Miki et al.

(10) Patent No.: US 7,023,495 B2
(45) Date of Patent: Apr. 4, 2006

(54) MULTI-INPUT VIDEO SIGNAL PROCESSING METHOD AND APPARATUS

(75) Inventors: Yoichiro Miki, Osaka (JP); Kenta Sokawa, Hyogo (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 536 days.

(21) Appl. No.: 10/180,486

(22) Filed: Jun. 27, 2002

(65) Prior Publication Data

US 2003/0001972 A1 Jan. 2, 2003

(30) Foreign Application Priority Data

Jun. 28, 2001 (JP) ............................ 2001-197155

(51) Int. Cl.
*H04N 5/45* (2006.01)

(52) U.S. Cl. ...................................... 348/584; 348/565

(58) Field of Classification Search ........ 348/565–569, 348/584, 588, 581, 678, 625, 383
See application file for complete search history.

(56) References Cited

U.S. PATENT DOCUMENTS 5,146,331 A * 9/1992 Tsuchida .................... 348/556
5,161,012 A 11/1992 Choi
5,351,129 A * 9/1994 Lai ............................ 348/584
5,452,012 A 9/1995 Saitoh
5,754,253 A * 5/1998 Lee ............................ 348/565
5,990,974 A * 11/1999 Amino et al. ............... 348/588
6,014,179 A * 1/2000 Kobayashi et al. ......... 348/556
6,020,931 A * 2/2000 Bilbrey et al. ............. 348/584
6,147,717 A 11/2000 Jun
6,151,002 A 11/2000 Kim

FOREIGN PATENT DOCUMENTS

CN 1161767 A 10/1997
CN 1181570 A 5/1998
EP 0 762 756 A2 3/1997
EP 0 767 583 A 4/1997
EP 1 185 093 A 3/2002
WO WO 96/13120 5/1996

* cited by examiner

*Primary Examiner*—Victor R. Kostak
(74) *Attorney, Agent, or Firm*—McDermott Will & Emery LLP

(57) ABSTRACT

The video signal processing method of this invention is employed in a video signal processing apparatus that includes a plurality of signal processing parts, each for executing signal processing, for processing two or more digitalized video signals in parallel, and the video signal processing method includes the steps of selecting one or more video signals from the two or more digitalized video signals; and obtaining an object video signal by selecting, from the plurality of signal processing parts, signal processing parts used for signal processing of the selected video signals in accordance with a mode of the object video signal and executing the signal processing in the selected signal processing parts in an order in accordance with the mode of the object video signal.

17 Claims, 26 Drawing Sheets

30 MAIN SYSTEM SIGNAL PROCESSOR
TO 13
34
QUALITY CORRECTION UNIT
33
HORIZONTAL RESIZE UNIT
32
VERTICAL RESIZE UNIT
31
FORMAT CONVERSION UNIT
35
MEMORY
VIM
SYNO
CLF
SCM

OUTPUT VERTICAL SYNC
OUTPUT HORIZONTAL SYNC
VIDEO SIGNAL

OUTPUT VERTICAL SYNC
DUMMY OUTPUT HORIZONTAL SYNC
VIDEO SIGNAL

INPUT VERTICAL SYNC
INPUT HORIZONTAL SYNC
VIDEO SIGNAL

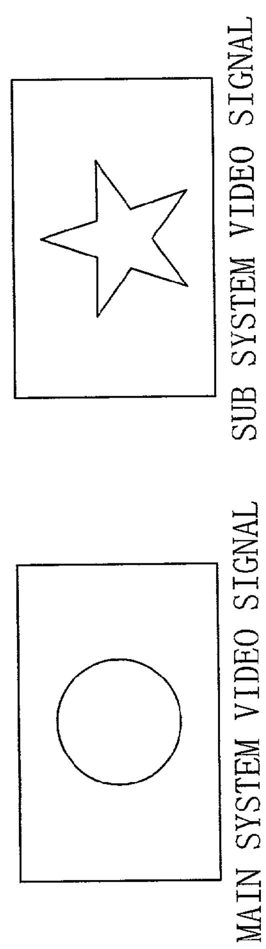
FIG. 5A
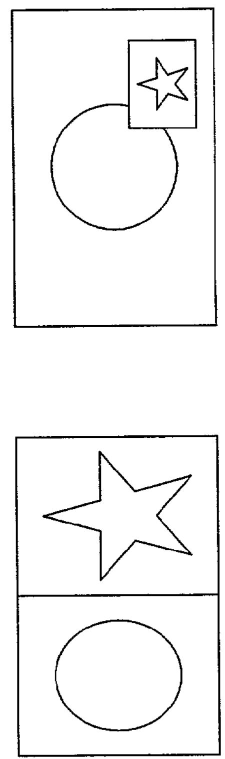
FIG. 5B
FIG. 5C
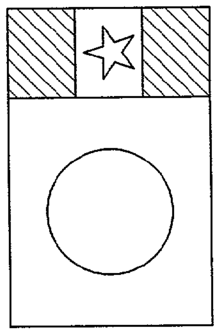
FIG. 5D
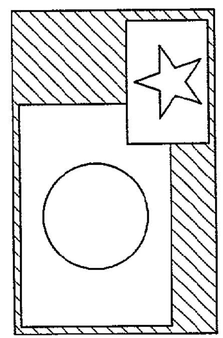
FIG. 5E

VO
13
VIDEO MIX SELECTOR
SELO
134
MAIN SYSTEM QUALITY CORRECTOR
144
SUB SYSTEM QUALITY CORRECTOR
130
MAIN SYSTEM SIGNAL PROCESSOR
240
SUB SYSTEM SIGNAL PROCESSOR
21
SELECTOR
SELM
23
MAIN SYSTEM HORIZONTAL REDUCTION CIRCUIT
24
SUB SYSTEM HORIZONTAL REDUCTION CIRCUIT
VIM
VIS
11
INPUT SIGNAL SELECTOR
VI1
VI2
VI3
SELI

MAIN SYSTEM INPUT CLOCK
MAIN SYSTEM INPUT HORIZONTAL SYNC
ORIGINAL VIDEO SIGNAL
MEMORY READ AFTER HORIZONTAL REDUCTION

SUB SYSTEM INPUT CLOCK
SUB SYSTEM INPUT HORIZONTAL SYNC
ORIGINAL VIDEO SIGNAL
MEMORY READ AFTER HORIZONTAL REDUCTION

SCREEN SYNTHESIS AS INTERLACED SIGNALS

VI1
VI2
VI3
SELI
11
INPUT SIGNAL SELECTOR
VIM
VIS
23
MAIN SYSTEM HORIZONTAL REDUCTION CIRCUIT
24
SUB SYSTEM HORIZONTAL REDUCTION CIRCUIT
21
SELECTOR
SELM
130
MAIN SYSTEM SIGNAL PROCESSOR
240
SUB SYSTEM SIGNAL PROCESSOR
25
SELECTOR
26
SELECTOR
SEL1
SEL2
234
MAIN SYSTEM QUALITY CORRECTOR
244
SUB SYSTEM QUALITY CORRECTOR
13
VIDEO MIX SELECTOR
SELO
VO

VI1
VI2
VI3
SEL1
11
INPUT SIGNAL SELECTOR
61
MAIN SYSTEM MEMORY
62
SUB SYSTEM MEMORY
51
TIME DIVISION MULTIPLEXING SELECTOR
CTD
52
FORMAT CONVERTER
53
VERTICAL RESIZE UNIT
54
HORIZONTAL RESIZE UNIT
55
QUALITY CORRECTOR
57
FRAME MEMORY
58
MEMORY CONTROL/SCREEN SYNTHESIS PART
VO
56 SCREEN SYNTHESIS/CLOCK CONVERSION UNIT

MULTI-INPUT VIDEO SIGNAL PROCESSING METHOD AND APPARATUS

BACKGROUND OF THE INVENTION

The present invention relates to a video signal processing technique, and more particularly, it relates to a technique for displaying a video signal on a display device.

Recently, video signals have been dealt with as digital signals. Also, signals to be input to video equipment have been diversified and there are a variety of signals such as video system signals, PC system signals and signals for game equipment. With respect to each of these various signals, there are a large number of formats. Therefore, display devices for displaying video signals, such as a CRT (cathode-ray tube), a liquid crystal display and a PDP (plasma display panel), are required to be applicable to a larger number of formats of the video signals.

Also, a display device is required to have a function to display one of the various formats of the video signals but to simultaneously display a multi-screen through synthesis of a plurality of video signals. Furthermore, it is indispensable to perform resize processing for matching the numbers of pixels arranged in the vertical and horizontal directions in one screen of the video signal with the numbers of pixels of a display device or of a desired screen size.

In order to realize these functions, video signal processing circuits respectively corresponding to the formats of video signals to be input are conventionally designed, so as to construct a video signal processing system by combining these processing circuits. Accordingly, as the number of formats of processable video signals is increased, the circuit scale tends to increase. Furthermore, a large memory capacity is necessary for coping with a video signal format with a large screen size.

SUMMARY OF THE INVENTION

An object of the invention is providing a video signal processing method and a video signal processing apparatus for performing processing in accordance with the format of an input video signal and the mode of a video signal to be obtained as an output, such as the number of screens to be simultaneously displayed and the screen size, so that a larger number of input video signal formats and output video signal modes can be dealt with without increasing the circuit scale.

The video signal processing method of this invention is employed in a video signal processing apparatus that includes a plurality of signal processing parts, each for executing signal processing, for processing two or more digitalized video signals in parallel, and the video signal processing method includes selecting one or more video signals from the two or more digitalized video signals; and obtaining an object video signal by selecting, from the plurality of signal processing parts, signal processing parts used for signal processing of the selected video signals in accordance with a mode of the object video signal and performing the signal processing in the selected signal processing parts in an order in accordance with the mode of the object video signal.

In one aspect of the video signal processing method, in the step of selecting one or more video signals, a plurality of video signals are preferably selected, and in the step of obtaining an object video signal, the object video signal is preferably obtained by synthesizing the selected plurality of video signals for displaying a synthesized screen of the plurality of video signals.

In one aspect of the video signal processing method, in the step of obtaining an object video signal, the object video signal is preferably in synchronization with a synchronization signal of one of the selected video signals.

In one aspect of the video signal processing method, in the step of obtaining an object video signal, the object video signal is preferably in synchronization with a synchronization signal different from a synchronization signal of any of the selected video signals.

In one aspect of the video signal processing method, the step of obtaining an object video signal preferably includes a plurality of sub-steps in each of which signal processing is performed in one of the signal processing parts, and the plurality of sub-steps are preferably executed in an order in accordance with a format of a video signal to be processed in the signal processing parts.

Thus, the signal processing in the signal processing parts are performed in an order in accordance with the format of the video signal, and hence, a larger number of formats of input video signals can be dealt with without increasing the circuit scale of the signal processing part.

Preferably, the plurality of sub-steps of the step of obtaining an object video signal include a sub-step of changing the format of the video signal to be processed and a sub-step of storing data of the video signal in a memory.

Preferably, the plurality of sub-steps of the step of obtaining an object video signal include a sub-step of resizing a screen of the video signal and a sub-step of storing data of the video signal in a memory.

In one aspect of the video signal processing method, the video signal processing apparatus preferably includes, as the plurality of signal processing parts, a signal processing part for performing signal processing on the basis of a fast clock having a higher frequency than a clock of the video signal input to the video signal processing apparatus.

Thus, since the video signal having been written in the memory can be read out by using the fast clock, screen resize processing can be easily performed.

In one aspect of the video signal processing method, the video signal processing apparatus preferably includes, as the plurality of signal processing parts, a signal processing part that performs signal processing without using the fast clock.

Thus, the signal processing part performs the signal processing without using a clock with a high frequency, and hence, the power consumption can be reduced.

Alternatively, the video signal processing method of this invention for synthesizing screens respectively corresponding to two or more digitalized video signals, includes the steps of time division multiplexing two or more video signals selected from a plurality of input video signals; and obtaining a synthesized video signal by synthesizing the selected video signals for displaying a synthesized screen, in which screens respectively corresponding to the selected video signals are synthesized, after performing signal processing on a time division multiplexed signal.

Thus, predetermined video signal processing are performed after the time division multiplexing of the necessary input video signals, and therefore, there is no need to provide an individual signal processing part for each input video signal, resulting in largely reducing the circuit scale.

The video signal processing apparatus of this invention that receives, as input video signals, a plurality of digitalized video signals and outputs an output video signal generated on the basis of video signal selected from the input video signals, includes an input signal selection unit for selecting, from the plurality of input video signals, one video signal as a main system video signal and another video signal as a sub system video signal and outputting the selected video signals; a main system signal processor for receiving the main system video signal, performing video signal processing by using a clock having a frequency higher than a clock frequency of the main system video signal and outputting a resultant video signal as an output thereof in synchronization with a synchronization signal of the output video signal; a sub system signal processor for receiving the sub system video signal, performing video signal processing by using a clock having a frequency higher than a clock frequency of the sub system video signal and outputting a resultant video signal as an output thereof in synchronization with the synchronization signal of the output video signal; a timing controller for receiving the synchronization signal of the output video signal and outputting an output select signal in synchronization with the synchronization signal of the output video signal; and a screen synthesis unit for receiving the outputs of the main system signal processor and the sub system signal processor and outputting the output video signal, in which screens are synthesized, through selection in accordance with the output select signal.

Thus, the screen synthesis can be performed after the video signal processing of the video signals freely selected from the plurality of input video signals.

Alternatively, the video signal processing apparatus of this invention that receives, as input video signals, a plurality of digitalized video signals and outputs an output video signal generated on the basis of video signal selected from the input video signals, includes an input signal selection unit for selecting, from the plurality of input video signals, one video signal as a main system video signal and another video signal as a sub system video signal and outputting the selected video signals; a main system signal processor for receiving the main system video signal, performing video signal processing by using a clock having a frequency higher than a clock frequency of the main system video signal and outputting a resultant signal as an output thereof; a main system quality corrector for performing picture quality correction on the output of the main system signal processor and outputting a resultant video signal as an output thereof; a sub system signal processor for receiving the sub system video signal, performing video signal processing and outputting a resultant signal as an output thereof; a sub system quality corrector for performing picture quality correction on the output of the sub system signal processor and outputting a resultant video signal as an output thereof; a timing controller for receiving a synchronization signal of the output video signal and outputting an output select signal in synchronization with the synchronization signal of the output video signal; and a screen synthesis unit for receiving the outputs of the main system quality corrector and the sub system quality corrector and outputting the output video signal, in which screens are synthesized, through selection in accordance with the output select signal.

Thus, the structure of the sub system signal processors can be simplified, so as to reduce the circuit scale. Also, circuits to be operated by using a fast clock are restricted, so as to reduce the power consumption.

In one aspect, the video signal processing apparatus preferably further includes a main system video selection unit for selecting and outputting one of the outputs of the main system video signal processor and the sub system video signal processor, and the main system signal processor preferably receives, instead of the main system video signal, an output of the main system video selection unit.

Thus, in single screen display where the main system signal alone is output, the screen size can be reduced by effectively using the inactive sub system signal processor. Therefore, a memory of the main system signal processor need not have a capacity corresponding to the screen size of the input video signal but may have a capacity corresponding to the screen size of the output video signal. Accordingly, the memory capacity, which is conventionally necessary for an input video signal with a large screen size, can be reduced.

In one aspect of the video signal processing apparatus, the sub system signal processor preferably outputs the output thereof in synchronization with a synchronization signal of the main system video signal, and the main system video selection unit preferably performs selection of video signals input thereto at timing synchronized with the synchronization signal, performs screen synthesis and outputs a resultant signal as an output thereof.

Thus, the main system video signal and the sub system video signals are synthesized for the screen synthesis, and the synthesized signal is processed by the main system signal processor. Therefore, the main and sub system video signals can be subjected to the same signal processing. Accordingly, a difference in the picture quality in the synthesized screen can be eliminated. In particular, in the case where the main system signal processor performs high level signal processing as compared with the sub system signal processors, both the main and sub system video signals can be subjected to the high level processing.

In one aspect of the video signal processing apparatus, the main system video selection unit preferably includes multipliers, respectively corresponding to video signals input thereto, for obtaining and outputting a product of each video signal input thereto and a gain of the video signal; an adder for adding outputs of the multipliers and outputting a sum as an output thereof; and a selector for selecting and outputting one of a plurality of video signals input to the main system video selection unit and the output of the adder, and the selector is preferably used for changing timing of the selection with respect to a synchronization signal of the main system video signal, and the gains used in the multipliers are preferably changed with substantially constantly keeping a sum thereof.

In one aspect, the video signal processing apparatus preferably further includes a main system horizontal reduction circuit for receiving the main system video signal, changing a number of pixels included in one line of a screen corresponding to the main system video signal to one or less time and outputting a resultant signal as an output thereof; and a sub system horizontal reduction circuit for receiving the sub system video signal, changing a number of pixels included in one line of a screen corresponding to the sub system video signal to one or less time and outputting a resultant signal as an output thereof, the main system video selection unit preferably receives, instead of the main system video signal, the output of the main system horizontal reduction circuit, and the sub system signal processor preferably receives, instead of the sub system video signal, the output of the sub system horizontal reduction circuit.

Thus, the various signal processing are performed after reducing the number of pixels arranged in the horizontal direction in consideration of the screen size of the output video signal, and hence, the memory capacities necessary for the various signal processing parts can be reduced. Also, in the case where the sub system video signal is displayed in a child screen smaller than the screen size of the output video signal, the sub system horizontal reduction circuit can reduce the number of pixels arranged in the horizontal direction in consideration of the screen size of the child screen. Accordingly, the sub system signal processor and the like may have memories with capacities each corresponding to the size of the child screen, so that the video signal processing can be realized with a smaller memory capacity.

At least one of the main system horizontal reduction circuit and the sub system horizontal reduction circuit preferably reduces the number of pixels included in one line of a screen corresponding to the video signal input thereto.

In one aspect, the video signal processing apparatus preferably further includes a main system quality correction selection unit for selecting one of the output of the main system signal processor and the output of the sub system signal processor and outputting the selected output; and a sub system quality correction selection unit for selecting one of the output of the main system signal processor and the output of the sub system signal processor and outputting the selected output, the main system quality corrector preferably receives, instead of the output of the main system signal processor, the output of the main system quality correction selection unit, the sub system quality corrector preferably receives, instead of the output of the sub system signal processor, the output of the sub system quality correction selection unit, and when the main system quality correction selection unit and the sub system quality correction selection unit both select the output of the main system signal processor, the main system quality corrector preferably separates, from the video signal input thereto, a signal obtained on the basis of the main system video signal, performs picture quality correction on a screen corresponding to the separated signal and outputs a resultant signal as the output, and the sub system quality corrector preferably separates, from the video signal input thereto, a signal obtained on the basis of the sub system video signal, performs the picture quality correction on a screen corresponding to the separated signal and outputs a resultant signal as the output.

Thus, the video signal obtained on the basis of the main system video signal and the video signal obtained on the basis of the sub system video signal are separated from each other. Therefore, each video signal can be subjected to the picture quality correction without being harmfully affected by the other video signal.

In one aspect of the video signal processing apparatus, the main system quality corrector preferably performs the picture quality correction on the screen corresponding to the signal obtained on the basis of the main system video signal with pixel values of pixels outside of the screen set to a given value, and the sub system quality corrector preferably performs the picture quality correction on the screen corresponding to the signal obtained on the basis of the sub system video signal with pixel values of pixels outside of the screen set to a given value.

Thus, the picture quality correction is performed after masking, with the fixed value, pixels present outside the screen corresponding to the video signal obtained on the basis of each of the main and sub system video signals. Therefore, for example, in the picture quality correction by using pixels arranged in the horizontal or vertical direction as a tap as in an HV enhancer, the quality degradation in the vicinity of the boundary between screens can be suppressed.

In one aspect of the video signal processing apparatus, the main system quality corrector preferably performs the picture quality correction on the screen corresponding to the signal obtained on the basis of the main system video signal with pixel values of pixels disposed on an edge corresponding to a boundary of the screen used as pixel values of pixels in a region outside of the screen and adjacent to the edge, and the sub system quality corrector preferably performs the picture quality correction on the screen corresponding to the signal obtained on the basis of the sub system video signal with pixel values of pixels disposed on an edge corresponding to a boundary of the screen used as pixel values of pixels in a region outside of the screen and adjacent to the edge.

Thus, in the case where the picture quality correction by using, for example, the HV enhancer, the quality degradation in the vicinity of the boundary between screens can be further suppressed.

In one aspect of the video signal processing apparatus, the sub system signal processor preferably includes a vertical resize frame synchronization part for performing conversion of a number of lines included in a screen corresponding to the video signal input thereto and outputting a resultant signal in synchronization with the synchronization signal of the output video signal.

In one aspect of the video signal processing apparatus, each of the main system signal processor and the sub system signal processor preferably includes a memory for storing a video signal, and a size and a position of a screen corresponding to each of the video signals is preferably changed by changing timing of reading from the memory and timing of selection by the screen synthesis unit.

In one aspect of the video signal processing apparatus, the video synthesis unit preferably includes multipliers, respectively corresponding to video signals input thereto, for obtaining and outputting a product of each video signal input thereto and a gain of the video signal; an adder for adding outputs of the multipliers and outputting a sum as an output thereof; and a selector for selecting one of a plurality of video signals input to the main system video selection unit and the output of the adder, and the selector is preferably used for changing timing of the selection with respect to a synchronization signal of the main system video signal, and the gains used in the multipliers are preferably changed with substantially constantly keeping a sum thereof.

In one aspect of the video signal processing apparatus, the main system signal processor preferably includes a format conversion unit, a vertical resize unit and a horizontal resize unit, the format conversion unit preferably converts a format of a video signal input thereto, the vertical resize unit preferably converts a number of lines included in one screen corresponding to a video signal input thereto, and the horizontal resize unit preferably converts a number of pixels included in one line of a screen corresponding to a video signal input thereto.

In one aspect of the video signal processing apparatus, the main system signal processor preferably includes selectors respectively for selecting inputs to the format conversion unit, the vertical resize unit and the horizontal resize unit, and an order of processing in the format conversion part, the vertical resize part and the horizontal resize part is preferably changed by switching inputs to the selectors.

Thus, the operation order of the respective elements of the main system signal processor is switched in accordance with the screen size of the main system video signal, so that the number of lines included in one screen of the input video signal can be previously reduced before the writing operation of the memory when the number of lines is large. Accordingly, a system applicable to a larger number of video signal formats can be constructed without increasing the memory capacity.

BRIEF DESCRIPTION OF THE DRAWINGS

FIGS. 5A, 5B, 5C, 5D and 5E are explanatory diagrams for showing examples of screen synthesis;

DETAILED DESCRIPTION OF THE INVENTION

Now, preferred embodiments of the invention will be described with reference to the accompanying drawings. In each embodiment described below, a video signal processing apparatus that receives video signals of three systems as input video signals so as to select one video signal of one system as a main system video signal and another as a sub system video signal for processing will be exemplified. It is herein assumed that a mode of an object video signal means, in addition to the format of the video signal, whether multi-screen display for simultaneously displaying a plurality of screens or high quality processing is to be performed, and the number of screens and the size of each screen in the multi-screen display. Also, a synchronization signal is assumed to include a vertical synchronization signal and a horizontal synchronization signal. Furthermore, a screen size is expressed not as a physical size but as the number of pixels.

EMBODIMENT 1

Figure 1:
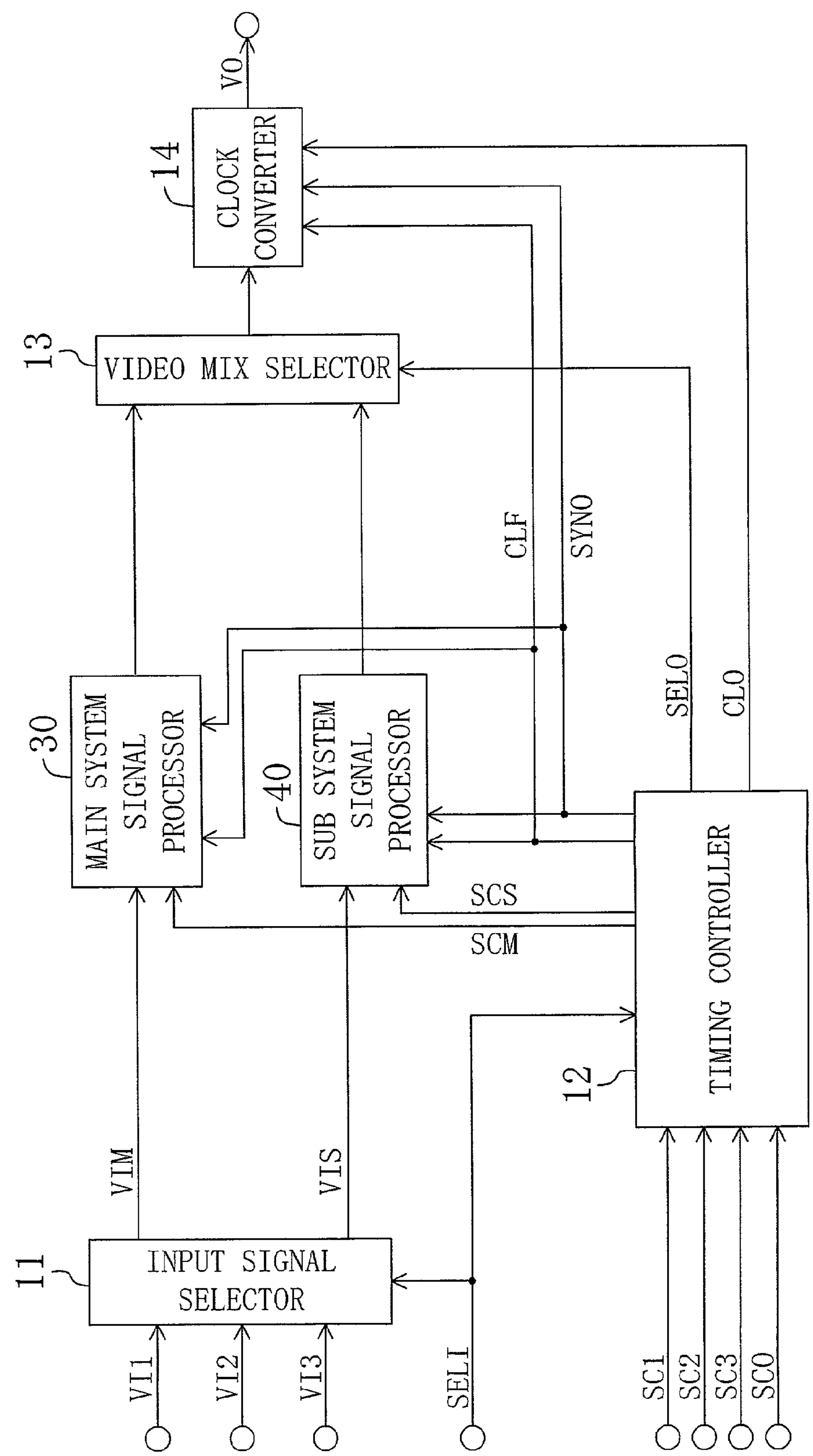
FIG. 1 is a block diagram of a video signal processing apparatus according to Embodiment 1 of the invention.

FIG. 1 is a block diagram of a video signal processing apparatus according to Embodiment 1 of the invention. The video signal processing apparatus of FIG. 1 includes an input signal selector 11 serving as an input signal selection unit, a timing controller 12, a main system signal processor 30, a sub system signal processor 40, a video mix selector 13 serving as a video synthesis unit and a clock converter 14.

The input signal selector 11 receives input video signals VI1, VI2 and VI3 of three systems and an input select signal SELI. These video signals are digital signals and are, for example, video signals for a TV or a PC. The input signal selector 11 selects, in accordance with the input select signal SELI, one of the input video signals VI1, VI2 and VI3 as a main system video signal VIM and another as a sub system video signal VIS, and outputs the main system video signal VIM to the main system signal processor 30 and the sub system video signal VIS to the sub system signal processor 40.

The timing controller 12 receives synchronization signals SC1, SC2 and SC3 respectively corresponding to the input video signals VI1, VI2 and VI3, a synchronization signal SCO for an output video signal VO output from this video signal processing apparatus and the input select signal SELI. In accordance with the input select signal SELI, the timing controller 12 outputs a synchronization signal SCM of the video signal selected as the main system video signal VIM to the main system signal processor 30 and outputs a synchronization signal SCS of the video signal selected as the sub system video signal VIS to the sub system signal processor 40. Each of the synchronization signals SC1, SC2, SC3, SCO, SCM and SCS includes a vertical synchronization signal, a horizontal synchronization signal and a clock of the corresponding video signal.

Also, the timing controller 12 outputs a fast clock CLF and an output synchronization signal SYNO to the main system signal processor 30, the sub system signal processor 40 and the clock converter 14. The output synchronization signal SYNO is a signal taken out from the synchronization signal SCO and includes vertical and horizontal synchronization signals. Furthermore, the timing controller 12 outputs an output select signal SELO to the video mix selector 13 and an output clock CLO taken out from the synchronization signal SCO to the clock converter 14.

The main system signal processor 30 and the sub system signal processor 40 respectively perform predetermined processing on the received video signals and output video signals resulting from the processing to the video mix selector 13. The video mix selector 13 selects one of the received video signals in accordance with the output select signal SELO and outputs the selected video signal to the clock converter 14. The clock converter 14 converts the clock of the received video signal into an output clock CLO, synchronizes the video signal with the output synchronization signal SYNO and outputs the resultant signal as the output video signal VO. The output video signal VO fits the screen size or the scanning method (interlaced scanning or progressive scanning) of a display device (such as a CRT, a liquid crystal display or a PDP) used for the display.

Figure 2:
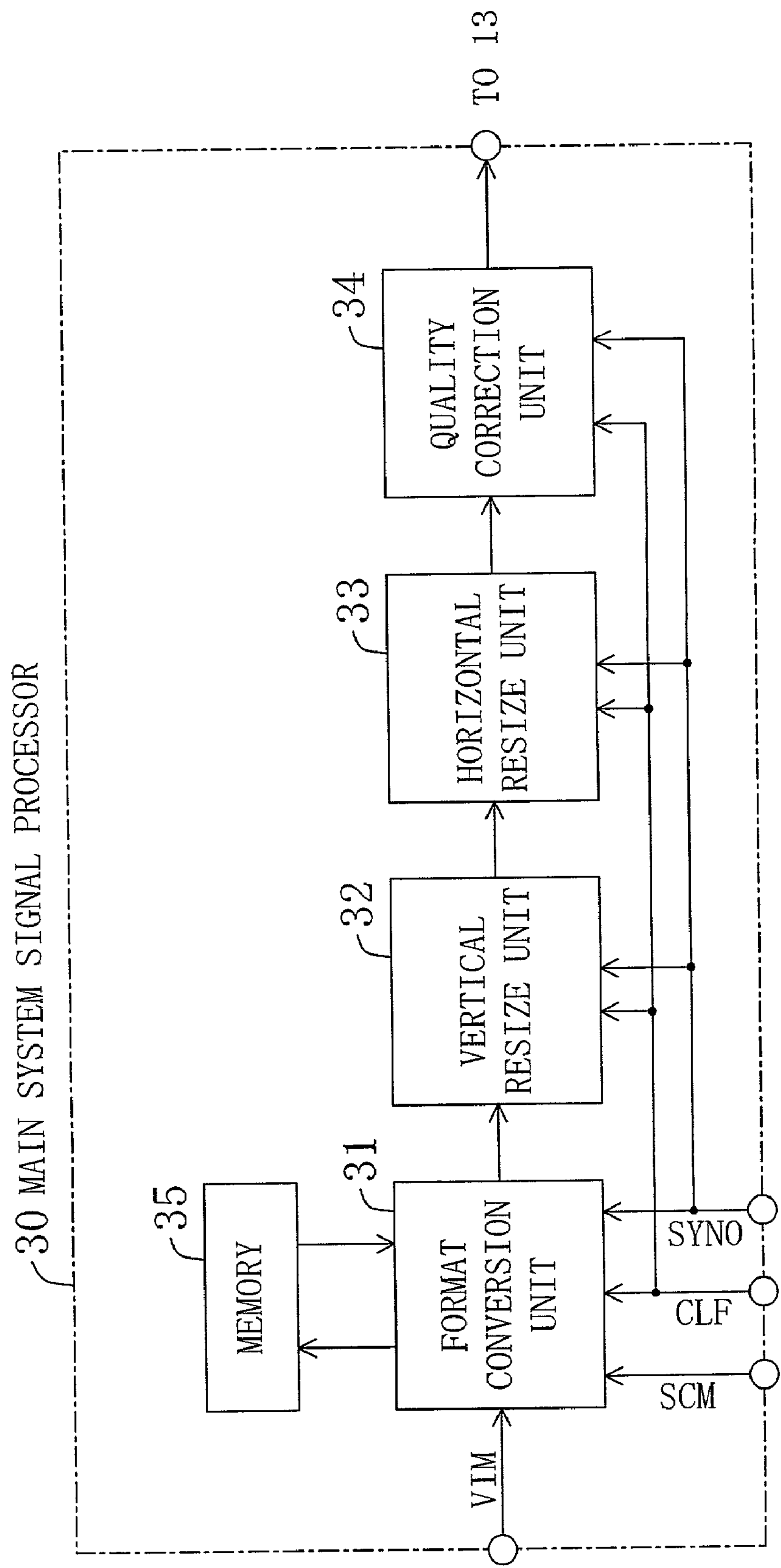
FIG. 2 is a block diagram of a main system signal processor of FIG. 1.

FIG. 2 is a block diagram of the main system signal processor 30 of FIG. 1. The main system signal processor 30 includes a format conversion unit 31, a vertical resize unit 32, a horizontal resize unit 33, a quality correction unit 34 and a memory 35.

The format conversion unit 31 receives the main system video signal VIM, the synchronization signal SCM, the fast clock CLF and the output synchronization signal SYNO. Also, the fast clock CLF and the output synchronization signal SYNO are input to the vertical resize unit 32, the horizontal resize unit 33 and the quality correction unit 34.

The memory 35 is, for example, a frame memory. The format conversion unit 31 writes the main system video signal VIM in the memory 35 by using a clock included in the synchronization signal SCM in synchronization with the vertical and horizontal synchronization signals included in the synchronization signal SCM of the main system video signal VIM. Thereafter, the format conversion unit 31 reads data from the memory 35 by using the fast clock CLF in synchronization with the output synchronization signal SYNO, and outputs the read data to the vertical resize unit 32.

In the following description, it is assumed, for example, that the fast clock CLF has a higher frequency than any clocks of the input video signals VI1, VI2 and VI3. For example, the fast clock CLF has a frequency ten times as high as that of the clocks of the input video signals VI1, VI2 and VI3. Also, the fast clock CLF need not be in synchronization with the clocks of these input video signals. It is noted that in each composing element, a clock with a higher frequency than the clocks obtained in inputting the video signals to be processed in the video signal processing apparatus of FIG. 1 (namely, the clocks of the input video signals VI1, VI2 and VI3) may be used as the fast clock, which applies to each of the embodiments described below.

In the case where the input video signal is, for example, an interlaced signal, the format conversion unit 31 performs format conversion such as IP conversion for converting the interlaced signal into a progressive signal to be output. In this case, "I" stands for the interlaced scanning and "P" stands for the progressive scanning. In the case where IP conversion using information on a plurality of fields is performed as in three-dimensional IP conversion, the memory 35 may store a video signal corresponding to a plurality of fields. Thus, the main system video signal VIM is changed in the signal format, the synchronization signal and the clock thereof.

Figure 3A:
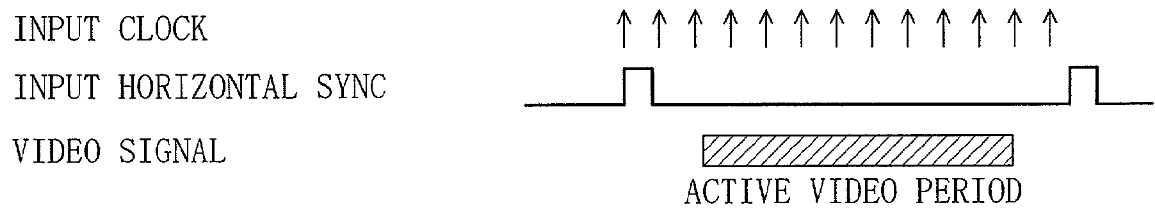
FIGS. 3A, 3B and 3C are explanatory diagrams for showing the relationship between a video signal, a horizontal synchronization signal and a clock.
Figure 3B:
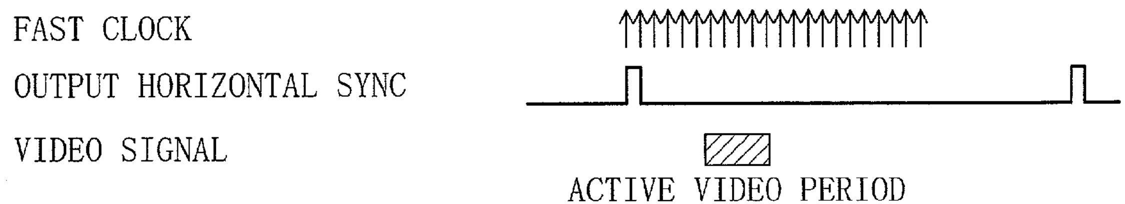
Figure 3C:
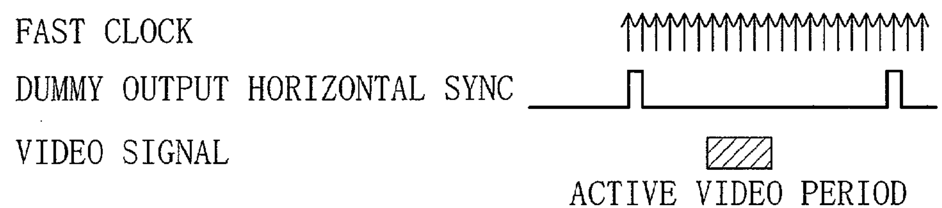

FIGS. 3A through 3C are explanatory diagrams for showing the relationship between the video signal, the horizontal synchronization signal and the clock. In each of these drawings, a video signal corresponding to one line of the main system video signal VIM is shown, and an arrow indicates each pulse of the clock. FIG. 3A shows the relationship obtained in writing the main system video signal in the memory 35. The main system video signal VIM is written in the memory 35 by using the clock thereof (input clock). FIG. 3B shows the relationship obtained in reading the video signal from the memory 35. The video signal is read from the memory 35 by using the fast clock CLF. Since the video signal is read by using the fast clock CLF, data of the same number of pixels can be read in a shorter time, and hence, an active video period corresponding to one line can be shortened. Therefore, a horizontal synchronization period can be shortened. In reverse, the horizontal synchronization period can be elongated. FIG. 3C shows the relationship obtained when the horizontal synchronization period is shortened. Herein, such a horizontal synchronization signal resulting from the period change is designated as a dummy output horizontal synchronization signal. The format conversion unit 31 generates the dummy output horizontal synchronization signal on the basis of the output horizontal synchronization signal, and outputs the dummy output horizontal synchronization signal and the read video signal to the vertical resize unit 32.

Figures 4A, 4B, 4C:
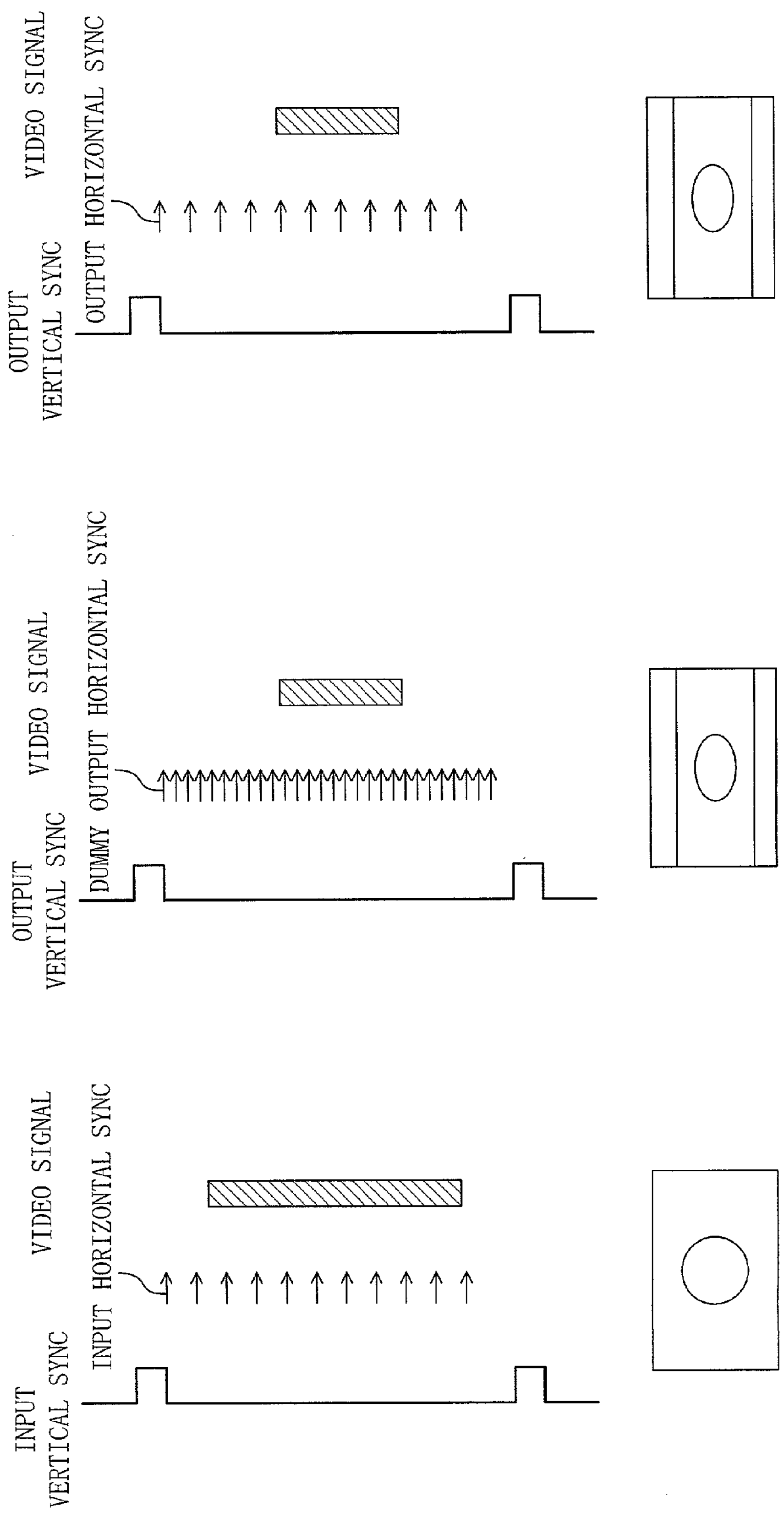
FIGS. 4A, 4B and 4C are explanatory diagrams for showing the relationship between a video signal and a horizontal synchronization signal.

FIGS. 4A through 4C are explanatory diagrams for showing the relationship between the video signal and the horizontal synchronization signal. In each of these drawings, a video signal corresponding to one field of the main system video signal VIM is shown, and an arrow indicates each pulse of the horizontal synchronization signal. FIG. 4A shows the relationship obtained in writing the video signal in the memory 35 and FIG. 4B shows the relationship obtained in reading the video signal from the memory 35. In the case where the horizontal synchronization period is shortened as shown in FIG. 3C, all the lines included in one field can be read in a shorter time, resulting in obtaining a screen compressed in the vertical direction. FIG. 4C shows the relationship between the output horizontal synchronization signal and the video signal. The vertical resize unit 32 synchronizes the received video signal with the output synchronization signal SYNO, performs filtering processing and outputs the resultant signal to the horizontal resize unit 33.

In this manner, the resize in the vertical direction of a screen can be carried out, namely, the number of lines included in one screen can be converted. Although the compression in the vertical direction is described in the above, expansion in the vertical direction can be similarly carried out by elongating the dummy output horizontal synchronization period. When the dummy output horizontal synchronization period is changed, the size in the vertical direction of the screen can be continuously changed.

The horizontal resize unit 33 converts the number of pixels arranged in the horizontal direction in one screen and outputs the resultant signal to the quality correction unit 34. The horizontal resize unit 33 writes, for example, pixel data corresponding to one line in the memory, and converts the number of pixels by reading the data in a decimated manner or reading the same pixel data a plurality of times. The quality correction unit 34 performs picture quality correction, such as gray level correction, enhancement processing, brightness adjustment and color processing, on the received video signal, and outputs the resultant signal to the video mix selector 13. The description of the sub system signal processor 40 will be herein omitted because it is similar to the main system signal processor 30.

The video mix selector 13 selects, in accordance with the output select signal SELO output from the timing controller 12, one of the video signals output from the main system signal processor 30 and the sub system signal processor 40, and outputs the selected video signal to the clock converter 14. Both the video signal output from the main system signal processor 30 and the video signal output from the sub system signal processor 40 are in synchronization with the output synchronization signal SYNO and output by using the fast clock CLF. Therefore, the video mix selector 13 selects one of these video signals in accordance with the output select signal SELO in synchronization with the output synchronization signal SYNO, so as to execute screen synthesis.

FIGS. 5A through 5E are explanatory diagrams for showing examples of the screen synthesis. FIG. 5A shows screens corresponding to the main system video signal VIM and the sub system video signal VIS. These signals are synthesized by the video mix selector 13 after the format conversion and the resize performed in the main system signal processor 30 and the sub system signal processor 40. FIGS. 5B, 5C, 5D and 5E show examples of the synthesized screen output by the video mix selector 13.

Figure 6A:
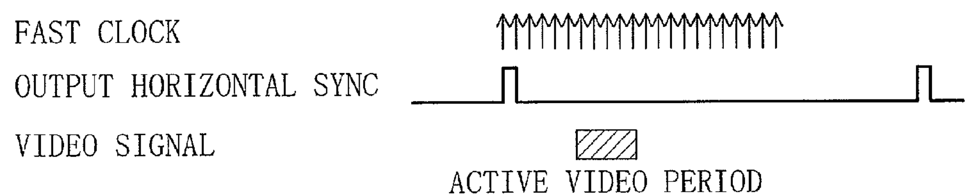
FIGS. 6A and 6B are explanatory diagrams for showing an operation of a clock converter.
Figure 6B:
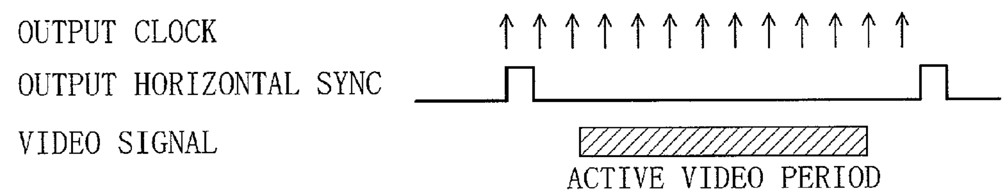

FIGS. 6A and 6B are explanatory diagrams for showing the operation of the clock converter 14. FIG. 6A shows the relationship between the fast clock CLF and a video signal corresponding to one line, and FIG. 6B shows the relationship between the output clock CLO and a video signal corresponding to one line.

The clock converter 14 receives the video signal, which is in synchronization with the fast clock CLF. The clock converter 14 writes, for example, a video signal corresponding to one line in a line memory by using the fast clock CLF, reads the video signal by using the output clock CLO and outputs the read signal as the output video signal VO. Accordingly, the clock of the video signal can be converted into the output clock CLO to be output.

As described above, the video signal processing apparatus of FIG. 1 includes the input signal selector 11, and hence, the screen synthesis can be performed after executing the processing such as the IP conversion with two of a plurality of input video signals freely selected. Since connection between a line for transmitting the input video signal and the video signal processing apparatus can be thus physically fixed, when the video signal processing apparatus of FIG. 1 is built as one chip, there is no need to change the connection of lines outside the chip. Accordingly, by using the video signal processing apparatus of FIG. 1, the design of an actual TV, a display and a signal processing system for display can be eased.

EMBODIMENT 2

Figure 7:
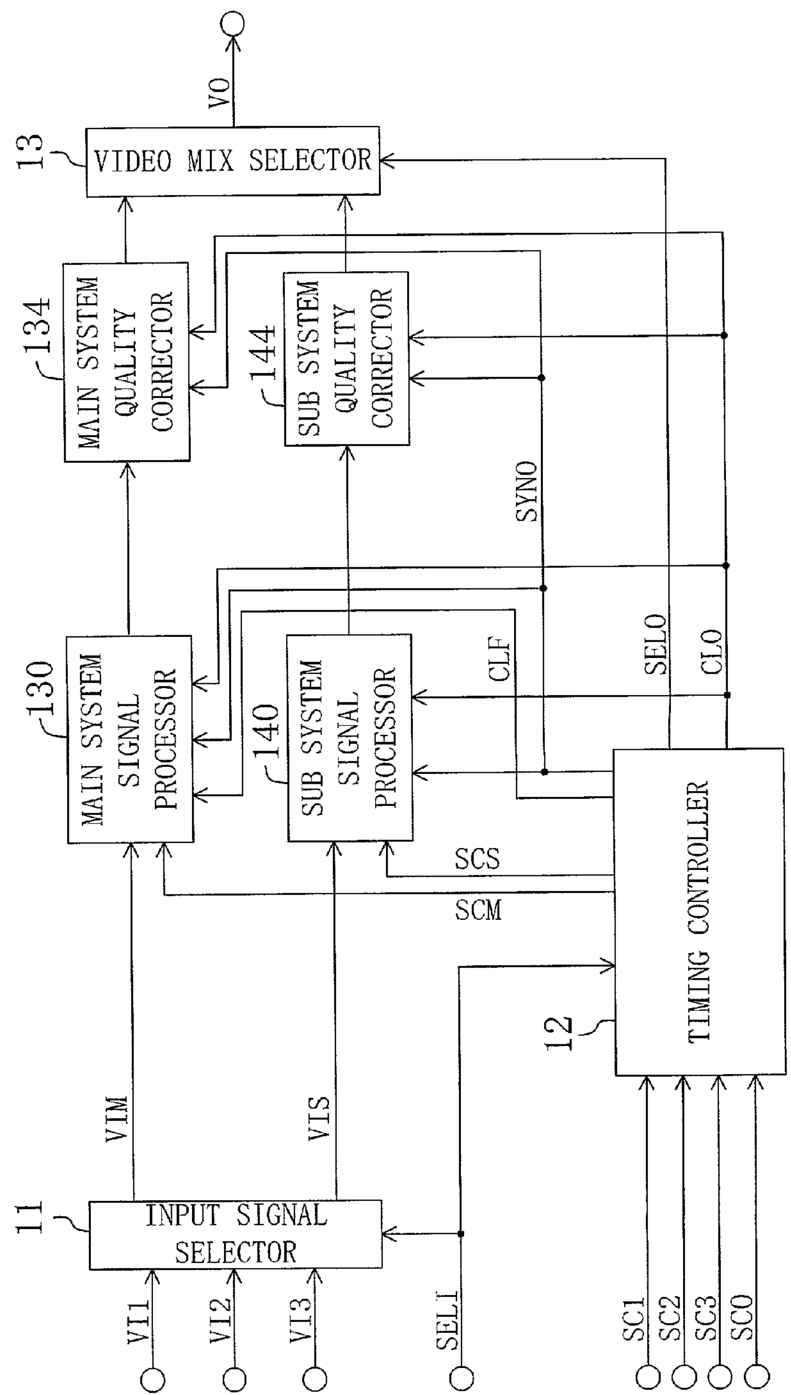
FIG. 7 is a block diagram of a video signal processing apparatus according to Embodiment 2 of the invention.

FIG. 7 is a block diagram of a video signal processing apparatus according to Embodiment 2 of the invention. As compared with the video signal processing apparatus of FIG. 1, the video signal processing apparatus of FIG. 7 includes a main system signal processor 130 instead of the main system signal processor 30, a sub system signal processor 140 instead of the sub system signal processor 40, and additionally includes a main system quality corrector 134 and a sub system quality corrector 144, whereas the clock converter 14 is not included. The output clock CLO is also input to the main system signal processor 130 and the sub system signal processor 140. The fast clock CLF is not input to the sub system signal processor 140.

Figure 8:
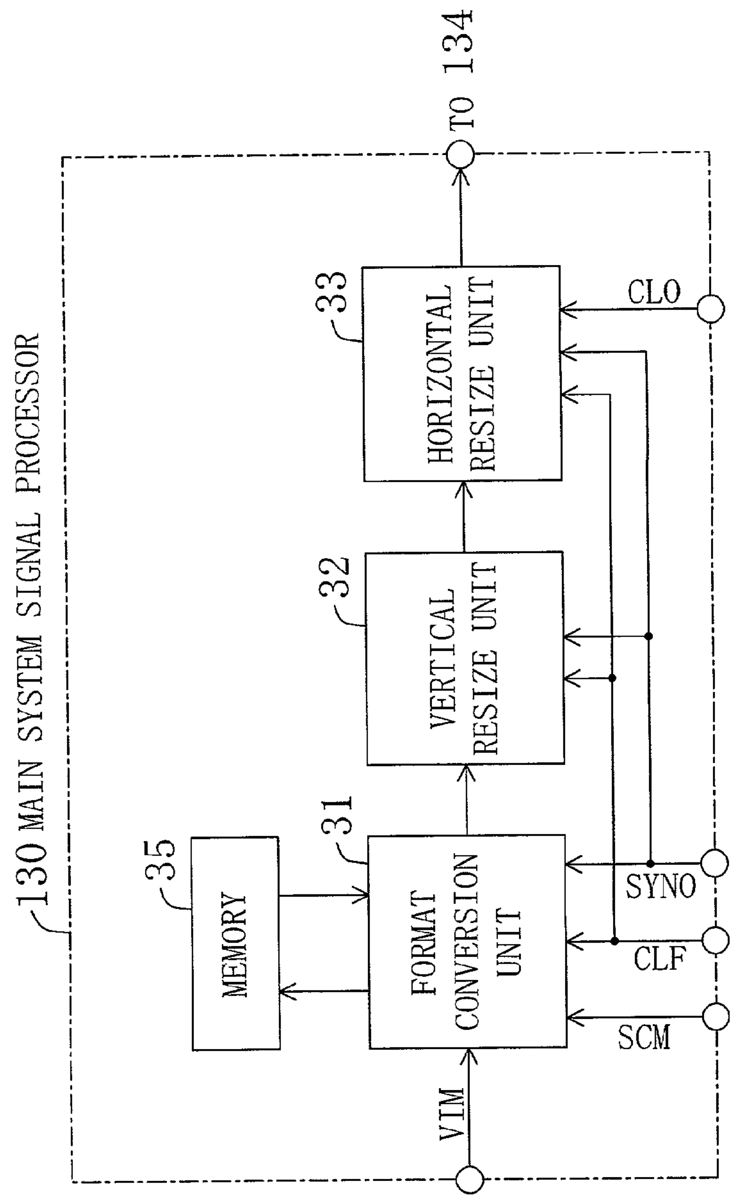
FIG. 8 is a block diagram of a main system signal processor of FIG. 7.

FIG. 8 is a block diagram of the main system signal processor 130 of FIG. 7. The main system signal processor 130 includes the same composing elements as the main system signal processor 30 of FIG. 2 except for the quality correction unit 34. The output clock CLO is input to the horizontal resize unit 33. The format conversion unit 31, the vertical resize unit 32 and the memory 35 are the same as those described referring to FIG. 2 and hence the description is omitted.

Figure 9:
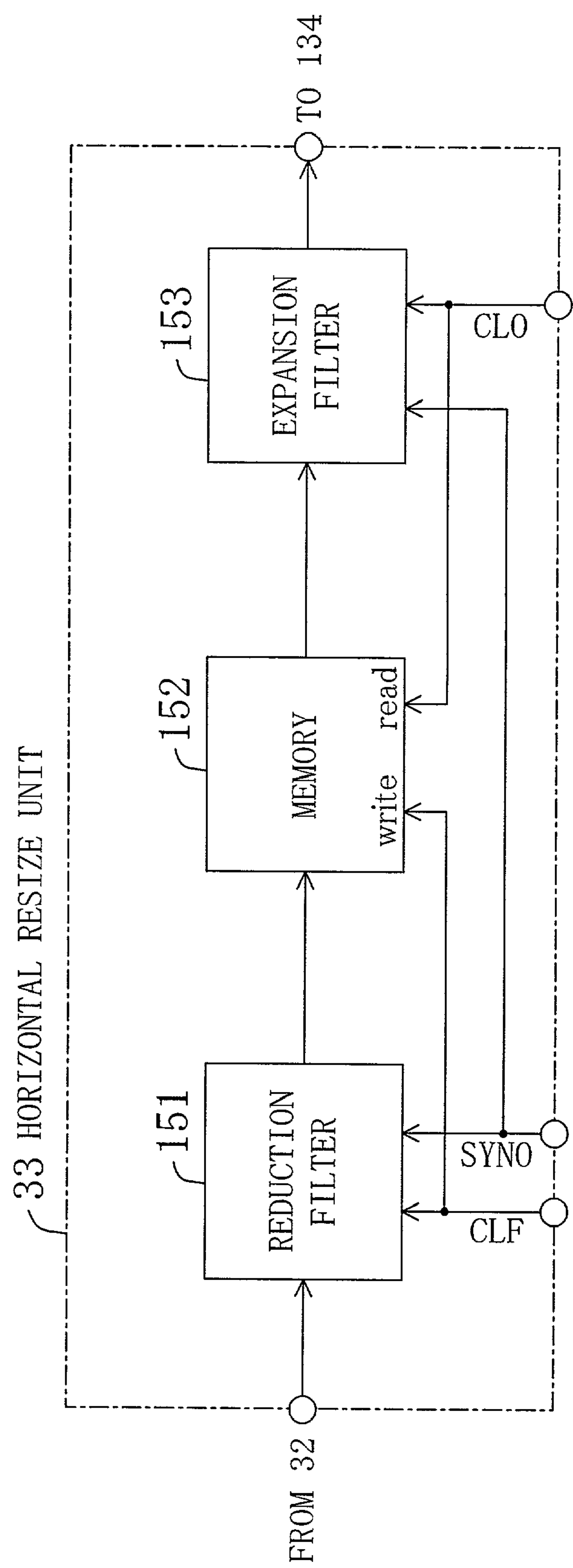
FIG. 9 is a block diagram of a horizontal resize unit of FIG. 8.

FIG. 9 is a block diagram of the horizontal resize unit 33 of FIG. 8. The horizontal resize unit 33 includes a reduction filter 151, a memory 152 and an expansion filter 153. The fast clock CLF is input to the reduction filter 151 and the memory 152, and the output synchronization signal SYNO is input to the reduction filter 151 and the expansion filter 153. Also, the output clock CLO is input to the memory 152 and the expansion filter 153.

The reduction filter 151 performs filtering processing on the received signal and writes the resultant signal in the memory 152 with pixels decimated in accordance with a necessary reduction ratio. The memory 152 is, for example, a line memory having a capacity sufficient for storing pixel data corresponding to one line, and uses the fast clock CLF as a writing clock and the output clock CLO as a reading clock. The expansion filter 153 reads the data from the memory 152 with a reading address stopped in accordance with a necessary expansion ratio, performs filtering processing and outputs the resultant signal to the main system quality corrector 134.

At this point, in the case where the reduction in the horizontal direction is to be performed, the expansion filter 153 reads the data from the memory 152 and merely allows the data to pass therethrough, and in the case where the expansion in the horizontal direction is to be performed, the reduction filter 151 merely allows the received signal to pass therethrough.

The horizontal resize unit 33 receives the output synchronization signal SYNO, and the fast clock CLF is used for writing data in the memory 152 and the output clock CLO is used for reading data from the memory 152. Therefore, the horizontal resize unit 33 can convert the clock of the video signal into the output clock CLO and can output the video signal in synchronization with the output synchronization signal SYNO. Accordingly, there is no need to include the clock converter 14 of FIG. 1.

Figure 10:
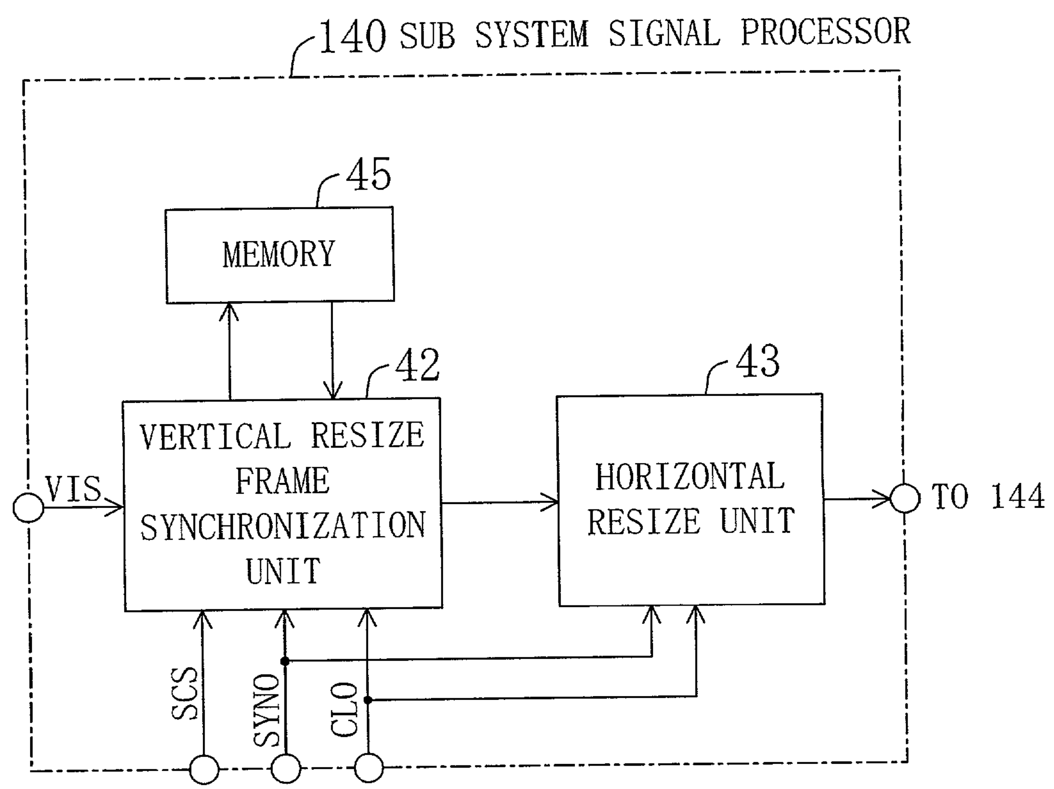
FIG. 10 is a block diagram of a sub system signal processor of FIG. 7.

FIG. 10 is a block diagram of the sub system signal processor 140 of FIG. 7. The sub system signal processor 140 FIG. 7 includes a vertical resize frame synchronization unit 42, a horizontal resize unit 43 and a memory 45.

The memory 45 is, for example, a frame memory. The vertical resize frame synchronization unit 42 writes the received sub system video signal VIS in the memory 45 by using the clock thereof in synchronization with the synchronization signal thereof, and reads the video data from the memory 45 by using the output clock CLO in synchronization with the output synchronization signal SYNO. Accordingly, the vertical resize frame synchronization unit 42 can convert the clock of the video signal into the output clock CLO and can output the video signal to the horizontal resize unit 43 in synchronization with the output synchronization signal SYNO.

The vertical resize frame synchronization unit 42 also performs vertical resize processing. In the case where the screen is to be reduced in the vertical direction, the vertical resize frame synchronization unit 42 performs filtering processing on the sub system video signal VIS, writes the resultant signal in the memory 45 with lines decimated in accordance with a necessary reduction ratio, and then the data is read in a general manner. Since the number of lines included in one screen is thus reduced, the screen can be reduced in the vertical direction. Even when the screen size of the sub system video signal VIS is larger than the screen size of the output video signal VO, the memory 45 may have a capacity corresponding to the screen size of the output video signal VO.

On the other hand, in the case where the screen is to be expanded in the vertical direction, the vertical resize frame synchronization unit 42 writes the video signal VIS in the memory 45 in a general manner, reads the video signal with a reading address stopped so as to read the same line twice or more times in accordance with a necessary expansion ratio, and performs the filtering processing. Thus, the number of lines included in one screen is increased, and hence, the screen can be expanded in the vertical direction.

Similarly, the vertical resize frame synchronization unit 42 can perform the IP conversion for converting an interlaced signal into a progressive signal by doubling the number of lines included in one field. However, the vertical resize frame synchronization unit 42 performs such simple IP conversion within a field alone and does not perform the IP conversion using a plurality of fields as that performed by the format converter 31 of FIG. 2. Therefore, the memory 45 need not have a capacity for storing a plurality of fields. Furthermore, since PI conversion for converting a progressive signal into an interlaced signal, II conversion and PP conversion are all line number conversion, the vertical resize frame synchronization unit 42 can execute such conversion in the same manner as the IP conversion.

The horizontal resize unit 43 performs, on the received video signal, processing for converting the number of pixels included in one line into a desired number and outputs the resultant signal to the sub system quality corrector 144. The structure and the operation of the horizontal resize unit 43 are substantially the same as those of the horizontal resize unit 33 described with reference to FIG. 9, whereas the output clock CLO is used instead of the fast clock CLF.

The main system quality corrector 134 and the sub system quality corrector 144 respectively perform the picture quality correction, such as the gray level correction, the enhancement processing, the brightness adjustment and the color processing, on the received video signals, and output the resultant signals to the video mix selector 13 by using the output clock CLO in synchronization with the output synchronization signal SYNO.

The video mix selector 13 selects one of the video signals output from the main system quality corrector 134 and the sub system quality corrector 144 in accordance with the output select signal SELO output from the timing controller 12, and outputs the selected video signal as the output video signal VO. At this point, the video mix selector 13 can perform the screen synthesis, for example, as described with reference to FIGS. 5B through 5E by appropriately switching the received two video signals to be output.

In this manner, in the video signal processing apparatus of FIG. 7, the sub system signal processor 140 is simplified as compared with the main system signal processor 130, and hence, the circuit scale can be reduced. In the case where two screens are simultaneously displayed as in FIGS. 5B through 5E, one screen is occasionally smaller than the other, and hence, rather low picture quality due to the simplification of the processing such as the IP conversion does not cause any serious problem in the small screen. Also, the main system signal processor 130 alone is operated with the frequency of the fast clock CLF and the other composing elements are operated with comparatively low frequencies of the output clock CLO and the like. Therefore, power consumption can be reduced.

On the other hand, the main system signal processor 130 can perform high level image processing such as the IP conversion using a plurality of fields. Also, since the main system signal processor 130 is operated in accordance with the fast clock CLF, the vertical screen size can be resized to a desired size.

In the video signal processing apparatus of FIG. 7, one of the input video signals is processed by using the main system signal processor and another is processed by the sub system signal processor. There is no need to previously determine which input video signals are to be processed by the main system signal processor and the sub system signal processor, but signals to be processed by these processors can be freely selected from the input video signals at any time.

EMBODIMENT 3

Figure 11:
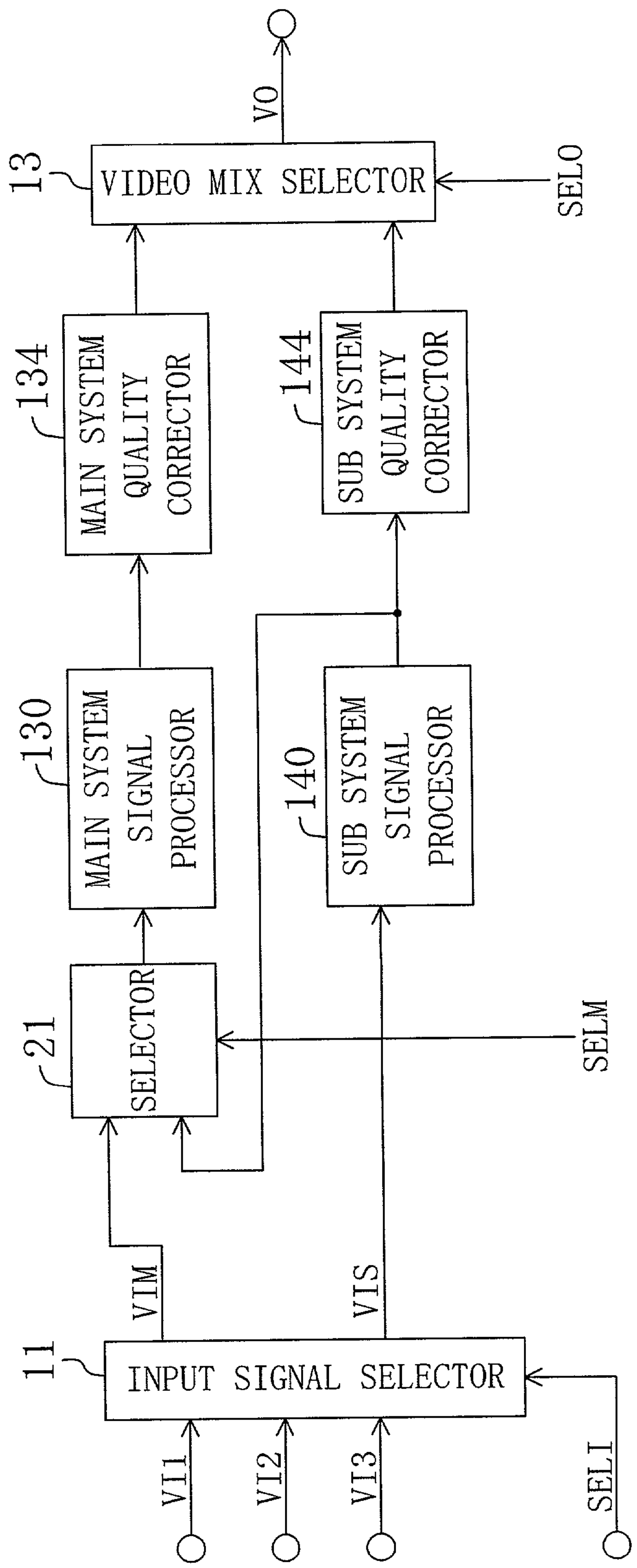
FIG. 11 is a block diagram of a video signal processing apparatus according to Embodiment 3 of the invention.

FIG. 11 is a block diagram of a video signal processing apparatus according to Embodiment 3 of the invention. The video signal processing apparatus of FIG. 11 includes, in addition to the composing elements of the video signal processing apparatus of FIG. 7, a main system input selector 21 serving as a main system video selection unit. In order to avoid complication, the timing controller 12, the synchronization signal and the clock are omitted in the drawings referred to below.

The main system input selector 21 receives the main system video signal VIM and the output signal of the sub system signal processor 140. The main system input selector 21 selects one of these signals in accordance with the main system select signal SELM output from the timing controller 12 and outputs the selected signal to the main system signal processor 130.

In Embodiment 3, the case where the main system signal processor 130 processes a video signal obtained after an input video signal of one system is reduced in the number of pixels included in one screen by the sub system signal processor 140 will be described.

It is assumed that the number of pixels included in one screen of an input video signal is larger than the number of pixels included in one screen of the output video signal VO, and specifically, it is assumed that a hi-vision signal of, for example, 1125i (namely, an interlaced signal including 1125 lines in one screen) is input and IP converted to be output with a size of a SVGA (super video graphics array; having 800 pixels in the horizontal direction and 600 lines in the vertical direction). The effective video region of this hi-vision signal is 1920 pixels in the horizontal direction and 540 lines in the vertical direction per field.

In a single screen mode of the video signal processing apparatus of FIG. 7, the input signal selector 11 selects an input video signal of one system and the main system signal processor 130 performs the processing such as the IP conversion and the resize processing on the selected video signal. In this case, the memory 35 of the main system signal processor 130 needs to have a capacity for storing data of 1920×540 pixels (which is the number of pixels of one field). Also, in order to generate a vertical tap necessary for the vertical filtering processing, the vertical resize unit 32 needs to have a line memory with a capacity for storing data of 1920 pixels. On the other hand, the sub system signal processor 140 is not specifically operated.

Therefore, in this embodiment, the sub system signal processor 140 first decimates the lines included in one screen and the pixels included in one line of the video signal, so as to convert the format of the video signal into a format of the output video signal VO, that is, the ultimate output. At this point, the IP conversion is not performed. Thereafter, the main system signal processor 130 receives the video signal resulting from the decimation, and hence, the necessary memory capacity of the main system signal processor 130 can be largely reduced.

In FIG. 11, the input signal selector 11 selects, in accordance with the input select signal SELI, one of the input video signals VI1, VI2 and VI3 as the sub system video signal VIS, and outputs the selected video signal to the sub system signal processor 140. The sub system signal processor 140 performs the vertical and horizontal resize processing on the received video signal, and outputs the resultant signal to the main system input selector 21. The main system input selector 21 selects the output of the sub system signal processor 140 in accordance with the main system select signal SELM, and outputs the selected signal to the main system signal processor 130.

The main system signal processor 130 performs the format conversion such as the IP conversion and the vertical and horizontal resize processing on the received video signal, and outputs the resultant signal to the main system quality corrector 134. The main system quality corrector 134 performs the picture quality correction on the output of the main system signal processor 130, and outputs the resultant signal to the video mix selector 13. Since the operations of the main system signal processor 130 and the main system quality corrector 134 are the same as those described in Embodiment 2, the detailed description is omitted. The video mix selector 13 selects the output of the main system quality corrector 134 in accordance with the output select signal SELO, and outputs the selected signal as the output video signal VO.

In this manner, when merely one input video signal is processed, the sub system signal processor 140, which is otherwise inactive, is effectively used. Therefore, the memory 35 of the main system signal processor 130 does not need to have a capacity corresponding to the screen size of the input video signal but may have a capacity corresponding to the screen size of the output video signal. Accordingly, the memory capacity, which is necessary for an input video signal with a large screen size, can be reduced.

EMBODIMENT 4

Figure 12:
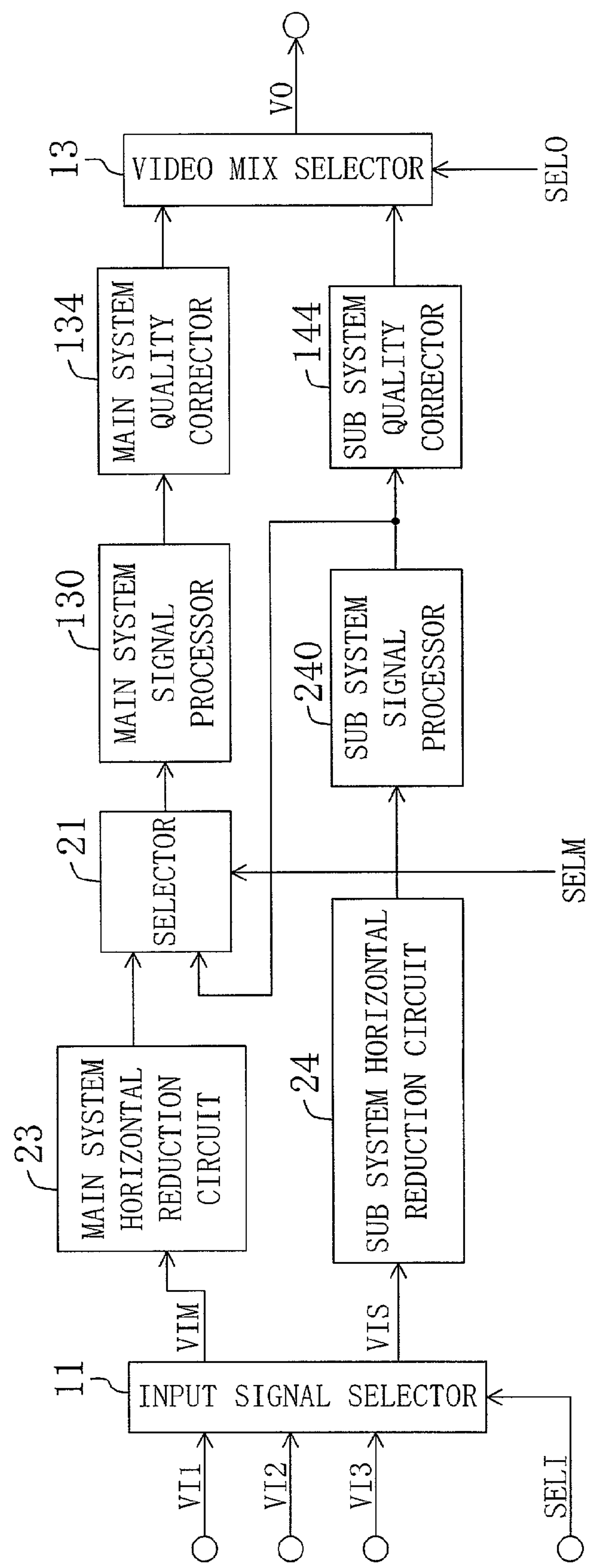
FIG. 12 is a block diagram of a video signal processing apparatus according to Embodiment 4 of the invention.

FIG. 12 is a block diagram of a video signal processing apparatus according to Embodiment 4 of the invention. As compared with the video signal processing apparatus of FIG. 11, the video signal processing apparatus of FIG. 12 includes a sub system signal processor 240 instead of the sub system signal processor 140, and additionally includes a main system horizontal reduction circuit 23 and a sub system horizontal reduction circuit 24. The other composing elements are the same as those described with reference to FIGS. 7 and 11 and the description is omitted.

The input signal selector 11 outputs the selected main system video signal VIM to the main system horizontal reduction circuit 23 and the selected sub system video signal VIS to the sub system horizontal reduction circuit 24.

Figure 13:
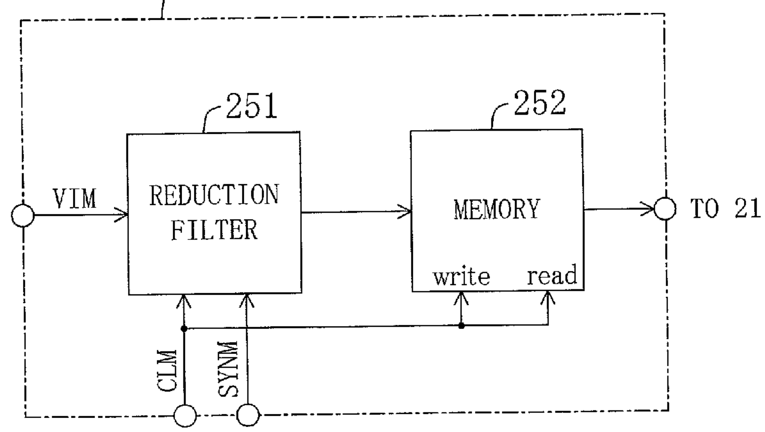
FIG. 13 is a block diagram of a main system horizontal reduction circuit of FIG. 12.

FIG. 13 is a block diagram of the main system horizontal reduction circuit 23 of FIG. 12. The main system horizontal reduction circuit 23 includes a reduction filter 251 and a memory 252. The reduction filter 251 receives the clock CLM and the synchronization signal SYNM of the main system video signal VIM. The memory 252 receives the clock CLM as a writing and reading clock. The clock CLM and the synchronization signal SYNM are together shown as the synchronization signal SCM in FIG. 7.

The reduction filter 251 performs the filtering processing on the received main system video signal VIM and writes data in the memory 252 with pixels decimated in accordance with a necessary reduction ratio. The video signal is decimated, for example, so that data of pixels included in one line of a screen of the output video signal VO can be written. The memory 252 is, for example, a line memory having a capacity sufficient for storing the data of pixels included in one line of the output video signal VO, and uses the clock CLM as the writing and reading clock. Since the data having been written with decimation is read from the memory 252, the reduction in the horizontal direction of the screen can be realized.

The main system input selector 21 selects the output of the main system horizontal reduction circuit 23 and outputs the selected signal to the main system signal processor 130. The output of the main system horizontal reduction circuit 23 may be directly supplied to the main system signal processor 130 with the main system input selector 21 omitted.

The sub system horizontal reduction circuit 24 is the same as the main system horizontal reduction circuit 23 except that it uses the clock and the synchronization signal of the sub system video signal VIS, and hence the detailed description is omitted. The sub system horizontal reduction circuit 24 performs the horizontal reduction processing on the sub system video signal VIS and outputs the resultant signal to the sub system signal processor 240.

Figure 14:
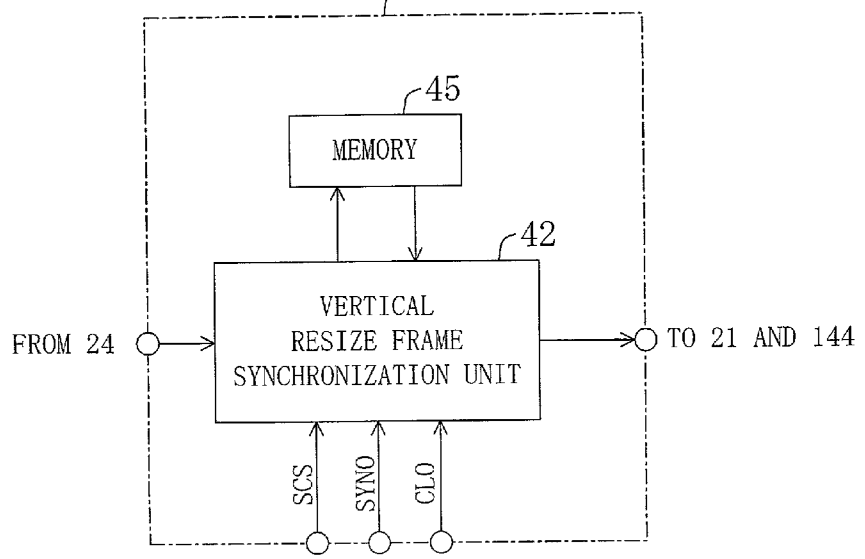
FIG. 14 is a block diagram of a sub system signal processor of FIG. 12.

FIG. 14 is a block diagram of the sub system signal processor 240 of FIG. 12. The sub system signal processor 240 of FIG. 14 is the same as the sub system signal processor 140 described with reference to FIG. 10 except that it does not include the horizontal resize unit 43. Specifically, the vertical resize frame synchronization unit 42 sends its output to the sub system quality corrector 144.

Similarly to Embodiment 2, the screen synthesis, for example, as described with reference to FIGS. 5B through 5E can be performed by appropriately switching the received two video signals to be output by the video mix selector 13.

In this manner, according to Embodiment 4, the respective signal processing are performed after reducing the number of horizontally arranged pixels in consideration of the number of horizontally arranged pixels included in the screen of the output video signal VO, and therefore, the memory capacities necessary for the main system signal processor 130 and the sub system signal processor 240 can be reduced. Also, in the case where the screen of the sub system is not full-screen displayed, for example, in the case where the number of pixels arranged in the horizontal direction can be always defined as a half or less of the pixels included in one line, the memory capacity of the sub system signal processor 240 can be one for storing data of a half of the pixels included in one screen of the output video signal VO. Thus, the video signal processing can be realized with a smaller memory capacity.

In the above description, the data is read from the memory 252 of the main system horizontal reduction circuit 23 by using the clock CLM of the received video signal. Instead, the data may be read by using the fast clock CLF. In this case, the data is written in the memory 35 of the main system signal processor 130 by using the fast clock CLF.

EMBODIMENT 5

In Embodiment 5, the main system input selector 21 of the video signal processing apparatus of FIG. 12 is used for the screen synthesis differently from Embodiment 4.

Figure 15A:
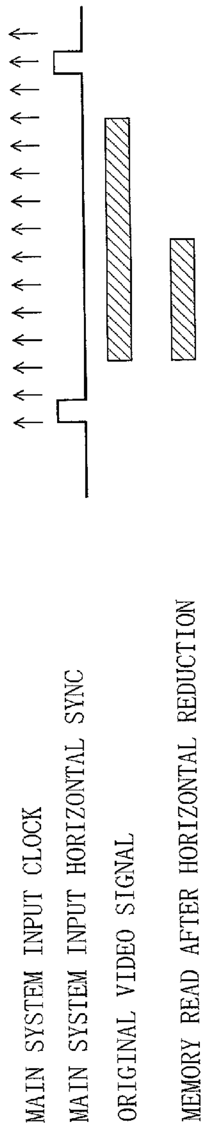
FIGS. 15A, 15B and 15C are explanatory diagrams for showing timings of video signals output from a main system horizontal reduction circuit and a sub system horizontal reduction circuit and an output of a main system input selector.
Figure 15B:
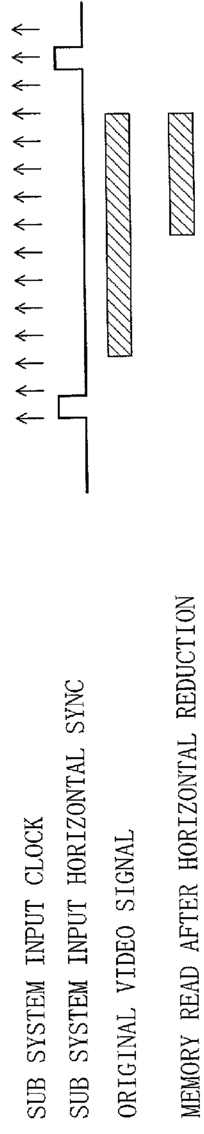
Figure 15C:
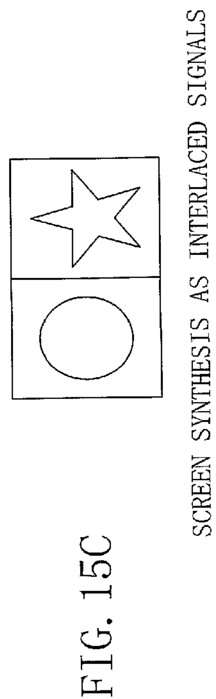

FIGS. 15A through 15C are explanatory diagrams for showing timings of the video signals output from the main system horizontal reduction circuit 23 and the sub system horizontal reduction circuit 24 and the output of the main system input selector 21. The main system horizontal reduction circuit 23 reduces the horizontal size of the screen of the main system video signal VIM selected by the input signal selector 11, and outputs the resultant signal to the main system input selector 21. On the other hand, the sub system horizontal reduction circuit 24 reduces the horizontal size of the screen of the sub system video signal VIS selected by the input signal selector 11, and outputs the resultant signal to the sub system signal processor 240. Each of the main system horizontal reduction circuit 23 and the sub system horizontal reduction circuit 24 reduces the horizontal size to, for example, a half.

FIG. 15A shows the timing of the video signal output from the main system horizontal reduction circuit 23 with respect to the horizontal synchronization signal of the main system video signal VIM. Thus, the main system horizontal reduction circuit 23 reads the data from the memory so that the screen of the main system video signal can be displayed in the left half area of the display. FIG. 15B shows the timing of the video signal output from the sub system horizontal reduction circuit 24 with respect to the horizontal synchronization signal of the sub system video signal VIS. Thus, the sub system horizontal reduction circuit 24 reads the data from the memory so that the screen of the sub system video signal can be displayed in the right half area of the display.

The sub system signal processor 240 performs the frame synchronization and the vertical resize processing on the output of the sub system horizontal reduction circuit 24 in the same manner as in Embodiment 4. However, in this embodiment, the frame synchronization is carried out so as to synchronize not with the output synchronization signal but with the synchronization signal SYNM of the main system video signal VIM.

The output of the sub system signal processor 240 is input to the main system input selector 21. The main system input selector 21 switches the input on the basis of the main system select signal SELM. The signals of the two systems input to the main system input selector 21 are both in synchronization with the main system video signal VIM, and hence, the screen synthesis can be eased. FIG. 15C shows an example of the synthesized screen.

The video mix selector 13 selects merely the output of the main system quality corrector 134 to output. The operation of the video signal processing apparatus of this embodiment is the same as that of the video signal processing apparatus of FIG. 12 except for that described above, and hence the description is omitted.

In this manner, the main system input selector 21 performs the screen synthesis in Embodiment 5. For example, in the case where both the main system video signal VIM and the sub system video signal VIS are interlaced signals, the sub system horizontal reduction circuit 24 and the sub system signal processor 240 respectively perform the resize processing and the frame synchronization on the sub system video signal VIS kept as the interlaced signal. Thereafter, the main system input selector 21 synthesizes the output of the sub system signal processor 240 with the main system video signal VIM.

Therefore, even when the IP conversion using information on other fields cannot be performed in the sub system signal processor 240, both the main system video signal VIM and the sub system video signal VIS can be subjected to high level IP conversion by using information on other fields for attaining high picture quality.

In particular, when the screens of the main system video signal VIM and the sub system video signal VIS are displayed in the same size as in the synthesized screen of FIG. 15C, if the methods of the IP conversion are different between the two screens, the difference in the picture quality between the two screens is disadvantageously obvious. However, there is no difference in the picture quality between the two screens according to this embodiment. Furthermore, after the screen synthesis, the screen size can be resized to an arbitrary size by the main system signal processor 130.

Figure 16:
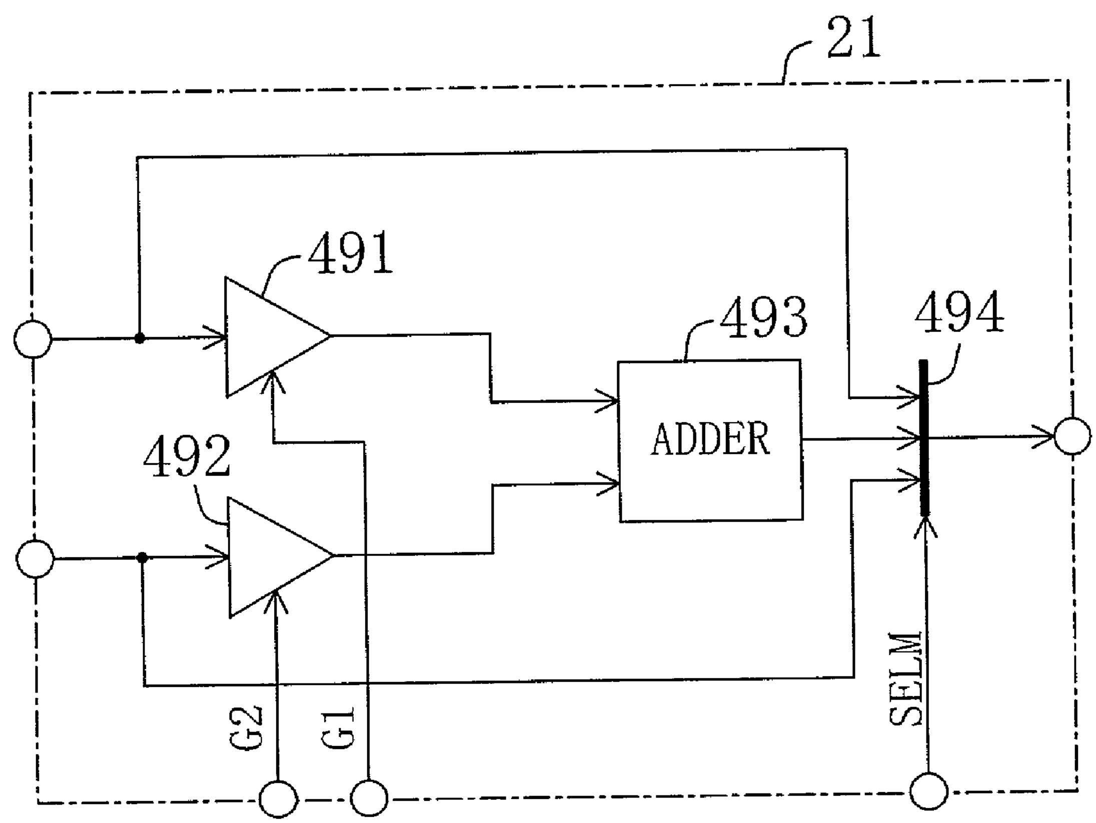
FIG. 16 is a block diagram for showing an exemplified structure of the main system input selector.

FIG. 16 is a block diagram of an exemplified structure of the main system input selector 21. The main system input selector 21 of FIG. 16 includes multipliers 491 and 492, an adder 493 and a selector 494.

The multiplier 491 receives the main system video signal and a gain G1. The gain G1 has a value of 0 through 1, and the multiplier 491 obtains a product of the main system video signal and the gain G1 and outputs the obtained product to the adder 493. Similarly, the multiplier 492 receives the sub system video signal and a gain G2. The gain G2 has a value of 0 through 1, and the multiplier 492 obtains a product of the sub system video signal and the gain G2 and outputs the obtained product to the adder 493.

The adder 493 adds the outputs of the multipliers 491 and 492 and outputs the obtained sum to the selector 494. At this point, when the sum of the gains G1 and G2 is 1, the adder 493 can appropriately blends the outputs of the multipliers 491 and 492. The adder 493 may perform limiter processing so as not to output a value exceeding a given value. The selector 494 selects, in accordance with the main system select signal SELM, one of the main system video signal, the sub system video signal and the output of the adder 493, and outputs the selected signal to the main system signal processor 130.

In this embodiment, the selector 494 may select either the main system video signal or the sub system video signal in accordance with the main system select signal SELM. The main system input selector 21 of FIG. 16 can additionally perform the following operations:

For example, when the selector 494 is set to select the output of the adder 493 and the values of the gains G1 and G2 are gradually varied every vertical blanking of the main system video signal, the video signal output from the main system input selector 21 can attain an effect that the proportion between the main system video signal and the sub system video signal is gradually changed.

Alternatively, the selector 494 is set to select either the main system video signal or the sub system video signal. When the main system select signal SELM is controlled so that the selection of the selector 494 is switched in a predetermined position within one horizontal scanning period and in a horizontal blanking period of the main system video signal and the switching position is gradually changed in the horizontal direction every vertical blanking, a screen switching effect for wiping out a displayed image in the horizontal direction can be attained.

The main system input selector 21 of FIG. 16 may be used as the video mix selector 13 shown in FIGS. 1, 7, 11, 12 and the like, and thus, the same effect can be attained. Also, although the input video signals are two systems in the above description, they may be three or more systems.

As described above, according to Embodiment 5, although the circuit scale of the sub system signal processor is small, both the main system video signal and the sub system video signal can be subjected to the same processing. In particular, when these video signals are subjected to the IP conversion, no difference is caused in the picture quality between screens obtained by the screen synthesis.

EMBODIMENT 6

Figure 17:
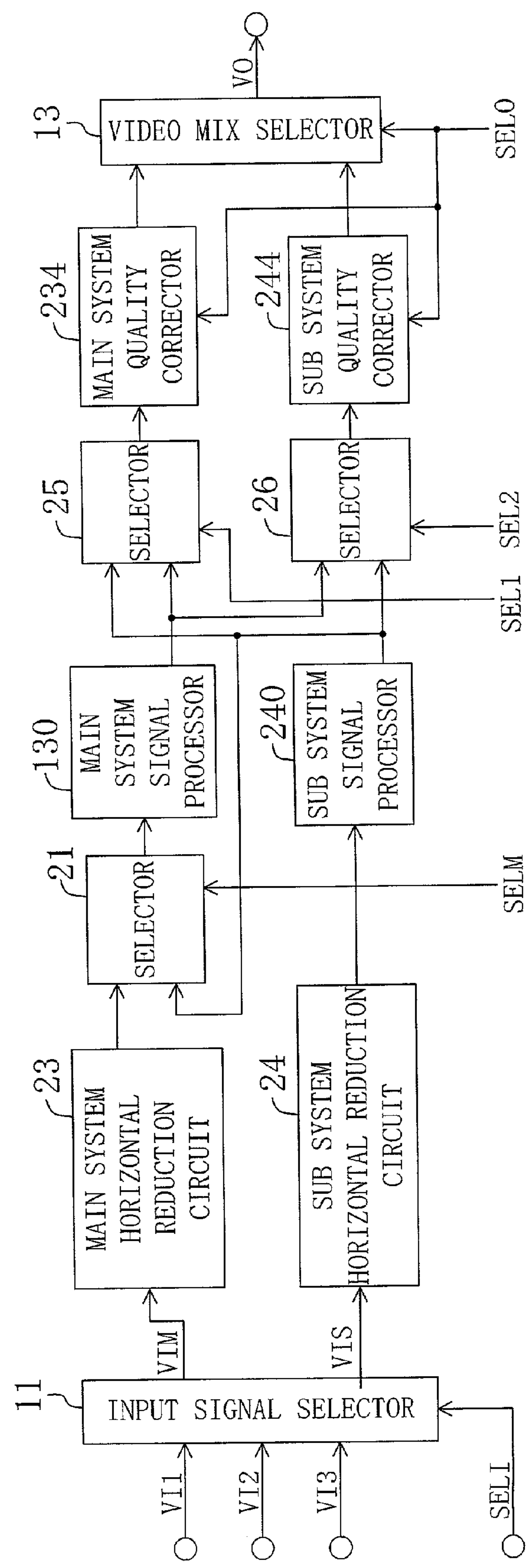
FIG. 17 is a block diagram of a video signal processing apparatus according to Embodiment 6 of the invention.

FIG. 17 is a block diagram of a video signal processing apparatus according to Embodiment 6 of the invention. The video signal processing apparatus of FIG. 17 includes, in addition to the composing elements of the video signal processing apparatus of Embodiment 5 described with reference to FIG. 12, a main system quality correction selector 25 serving as a main system quality correction selection unit and a sub system quality correction selector 26 serving as a sub system quality correction selection unit. Also, the main system quality corrector 134 and the sub system quality corrector 144 of Embodiment 5 are respectively replaced with a main system quality corrector 234 and a sub system quality corrector 244. The remaining structure is the same as that of Embodiment 5 and hence the detailed description is omitted.

The main system quality correction selector 25 receives the outputs of the main system signal processor 130 and the sub system signal processor 240. The main system quality correction selector 25 selects one of these outputs in accordance with a quality correction select signal SEL1 output from the timing controller and outputs the selected signal to the main system quality corrector 234.

The sub system quality correction selector 26 similarly receives the outputs of the main system signal processor 130 and the sub system signal processor 240. The sub system quality correction selector 26 selects one of these outputs in accordance with a quality correction select signal SEL2 output from the timing controller and outputs the selected signal to the sub system quality corrector 244.

When the main system quality correction selector 25 selects the output of the main system signal processor 130 and the sub system quality correction selector 26 selects the output of the sub system signal processor 240, this video signal processing apparatus is operated in the same manner as that of Embodiment 5. In Embodiment 6, both the main system quality correction selector 25 and the sub system quality correction selector 26 select the output of the main system signal processor 130. Accordingly, a video signal obtained through the screen synthesis of the main system input selector 21 and the processing such as the format conversion of the main system signal processor 130 is input to the main system quality corrector 234 and the sub system quality corrector 244.

The video signal processing apparatus of FIG. 17 may not include the main system quality correction selector 25 and the sub system quality correction selector 26. In other words, in the video signal processing apparatus of Embodiment 5 (shown in FIG. 12), the sub system quality corrector 244 may be directly supplied with the output of the main system signal processor 130 instead of the output of the sub system signal processor 240.

Figure 18:
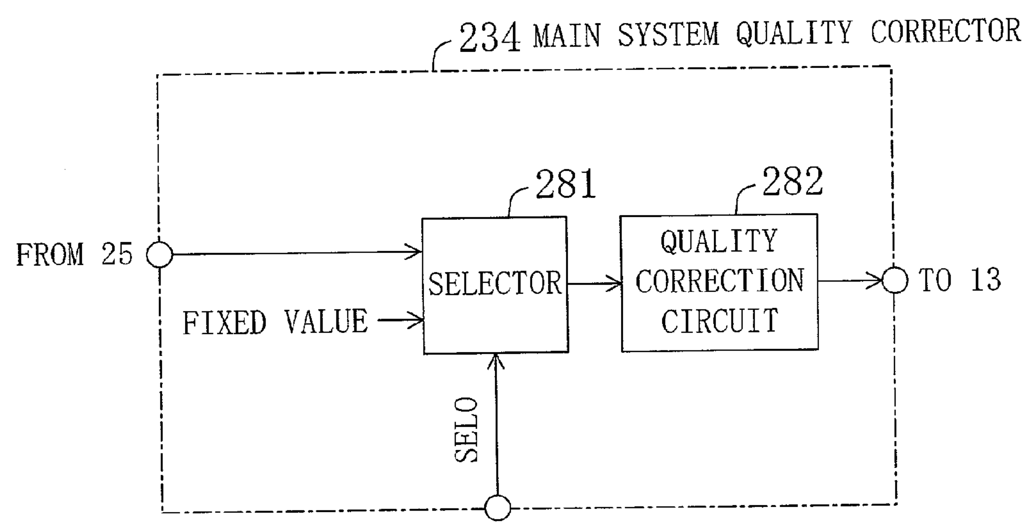
FIG. 18 is a block diagram of a main system quality corrector of FIG. 17.

FIG. 18 is a block diagram of the main system quality corrector 234 of FIG. 17. The main system quality corrector 234 of FIG. 18 includes a selector 281 and a quality correction circuit 282. The selector 281 receives the video signal output from the main system quality correction selector 25 and a predetermined fixed value. The selector 281 selects and outputs, in accordance with the output select signal SELO, the received video signal in a period when the video signal is obtained on the basis of the main system video signal VIM, and otherwise, the fixed value.

Figure 19D:
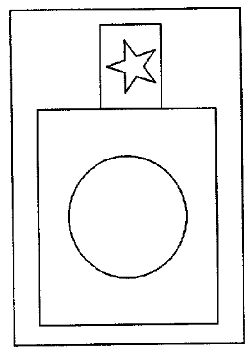
FIGS. 19A, 19B, 19C and 19D are explanatory diagrams of screens to be corrected by the main system quality corrector and a sub system quality corrector.
Figure 19C:
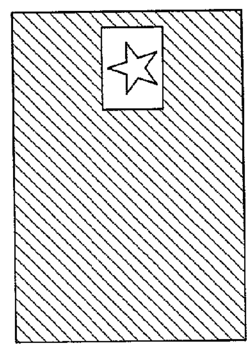
Figure 19B:
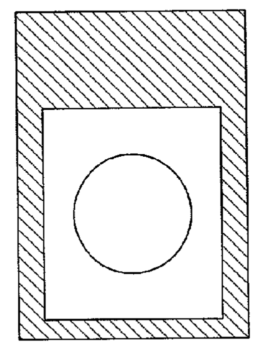
Figure 19A:
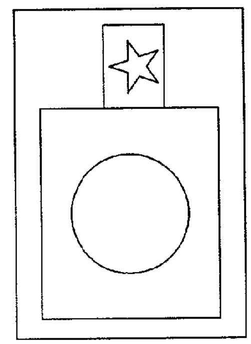

FIGS. 19A through 19D are explanatory diagrams for showing screens to be corrected in the picture quality by the main system quality corrector 234 and the sub system quality corrector 244. FIG. 19A shows a screen corresponding to the output of the main system signal processor 130. In this screen, a screen based on the main system video signal VIM (namely, a main region) and a screen based on the sub system video signal VIS (namely, a sub region) are displayed. FIG. 19B shows a screen corresponding to the output of the selector 281. The quality correction circuit 282 corrects the picture quality of a signal obtained by masking an area other than the main region (namely, a hatched area) with the fixed value, and outputs the resultant signal to the video mix selector 13.

The structure of the sub system quality corrector 244 is the same as that of the main system quality corrector 234. The selector of the sub system quality corrector 244 selects the received video signal in a period when the video signal is obtained on the basis of the sub system video signal VIS, and otherwise, the fixed value. FIG. 19C shows a screen corresponding to the output of the selector of the sub system quality corrector 244. The quality correction circuit of the sub system quality corrector 244 corrects the picture quality of a signal obtained by masking an area other than the sub region (namely, a hatched area) with the fixed value, and outputs the resultant signal to the video mix selector 13.

The video mix selector 13 selects one of the outputs of the main system quality corrector 234 and the sub system quality corrector 244 in accordance with the output select signal SELO, performs the screen synthesis and outputs the resultant signal. FIG. 19D shows a screen corresponding to the output of the video mix selector 13.

The quality correction circuit 282 performs processing by using an HV enhancer or the like. In this case, if an operation is carried out, on a boundary around the screen, between a pixel within the screen and another pixel of a different screen outside, the picture quality on the boundary is lowered. Since a portion outside the screen is defined as the fixed value in this embodiment, the lowering of the picture quality in the vicinity of the boundary can be suppressed.

Figure 20:
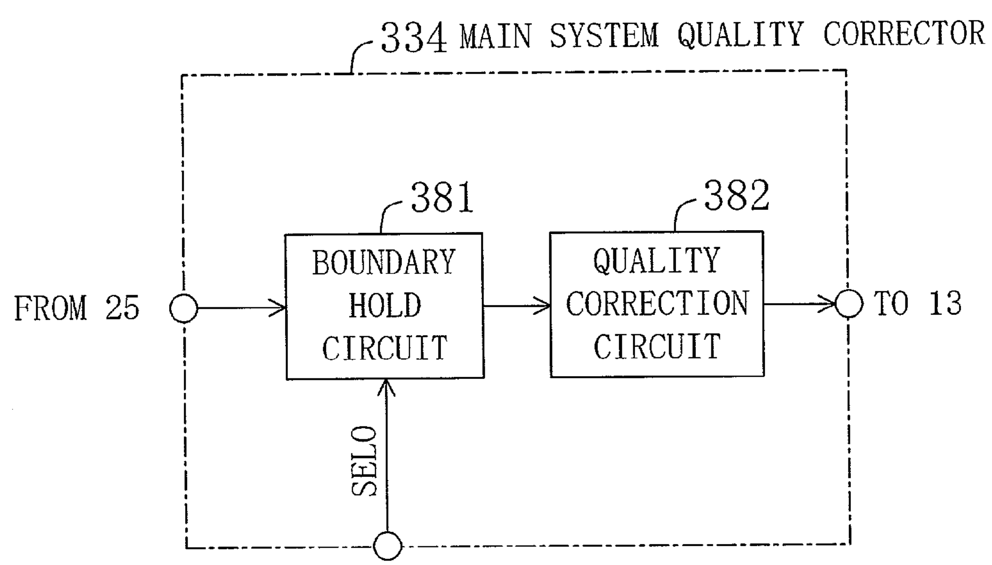
FIG. 20 is a block diagram of another main system quality corrector of FIG. 17.

FIG. 20 is a block diagram of a modification of the main system quality corrector 234 of FIG. 17. The video signal processing apparatus of FIG. 17 may include a main system quality corrector 334 of FIG. 20 instead of the main system quality corrector 234. In this case, the sub system quality corrector 244 is replaced with a sub system quality corrector similar to the main system quality corrector 334.

The main system quality corrector 334 of FIG. 20 includes a boundary hold circuit 381 and a quality correction circuit 382. The boundary hold circuit 381 receives the video signal output from the main system quality correction selector 25. The boundary hold circuit 381 outputs, in accordance with the output select signal SELO, the received video signal in a period when the video signal is obtained based on the main system video signal VIM. Otherwise, the boundary hold circuit 381 holds the values of the boundary of the screen of this video signal and output the held values. At this point, the values of pixels included in one line are held as the values of the upper end of the screen, and those included in another line are held as the values of the lower end thereof. The value of one pixel is held as the value of the right end in each line, and that of another pixel is held as the value of the left end therein.

Figures 21A, 21B, 21C, 21D:
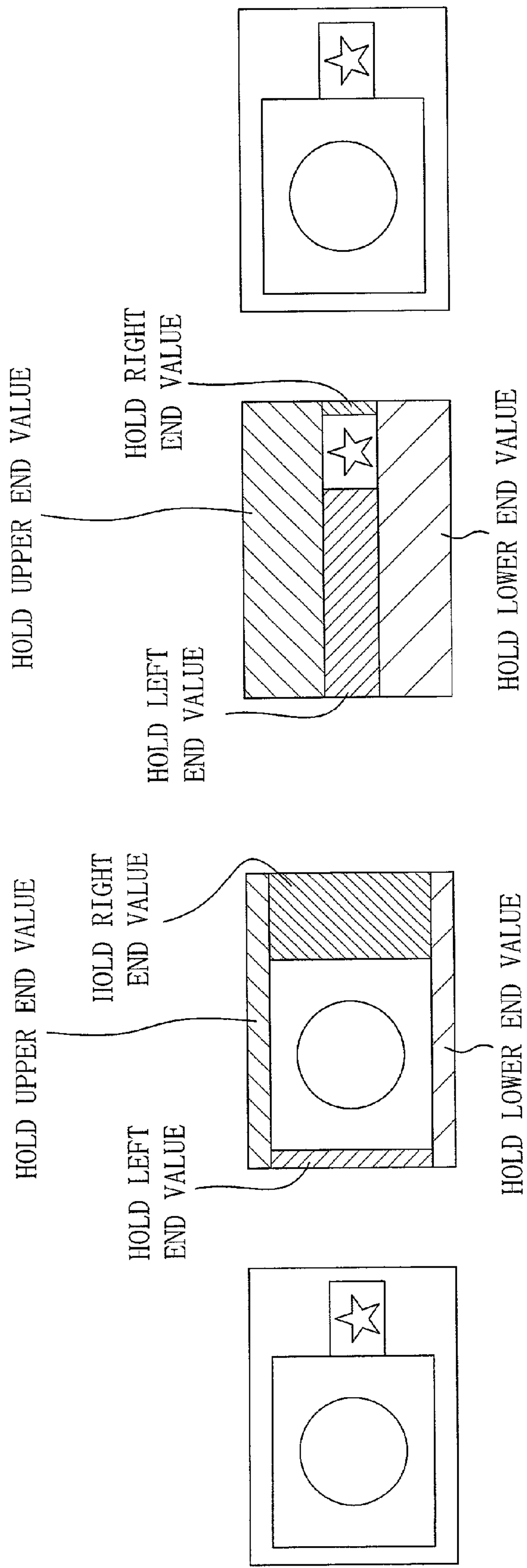
FIGS. 21A, 21B, 21C and 21D are explanatory diagrams of screens to be corrected by the main system quality corrector of FIG. 20 and a similar sub system quality corrector.

FIGS. 21A through 21D are explanatory diagrams for showing screens to be corrected in the picture quality by the main system quality corrector 334 of FIG. 20 and the equivalent sub system quality corrector. FIG. 21A shows a screen corresponding to the output of the main system signal processor 130. FIG. 21B shows a screen corresponding to the output of the boundary hold circuit 381. The quality correction circuit 382 corrects the picture quality of a signal obtained by masking an area other than the main region with the boundary values held by the boundary hold circuit 381, and outputs the resultant to the video mix selector 13.

FIG. 21C shows a screen corresponding to the output of the boundary hold circuit of the sub system quality corrector. The quality correction circuit of the sub system quality corrector corrects the picture quality of a signal obtained by masking an area other than the sub region with the boundary values held by the boundary hold circuit, and outputs the resultant signal to the video mix selector 13.

The video mix selector 13 selects one of the two inputs in accordance with the output select signal SELO, performs the screen synthesis and outputs the resultant signal. FIG. 21D shows a screen corresponding to the output of the video mix selector 13.

In this manner, since the pixel value of the boundary of the screen is used as a pixel value in an outside area of the screen, the lowering of the picture quality in the vicinity of the boundary can be suppressed. In this case, the lowering of the picture quality in the vicinity of the boundary can be more effectively suppressed than in the case where an area outside the screen is masked with a fixed value. Although the pixel values of the boundaries in all the four areas above, below and on the right and left sides of the screen are used in the above, the pixel values of the boundaries merely in the three or less areas may be used.

Figure 22:
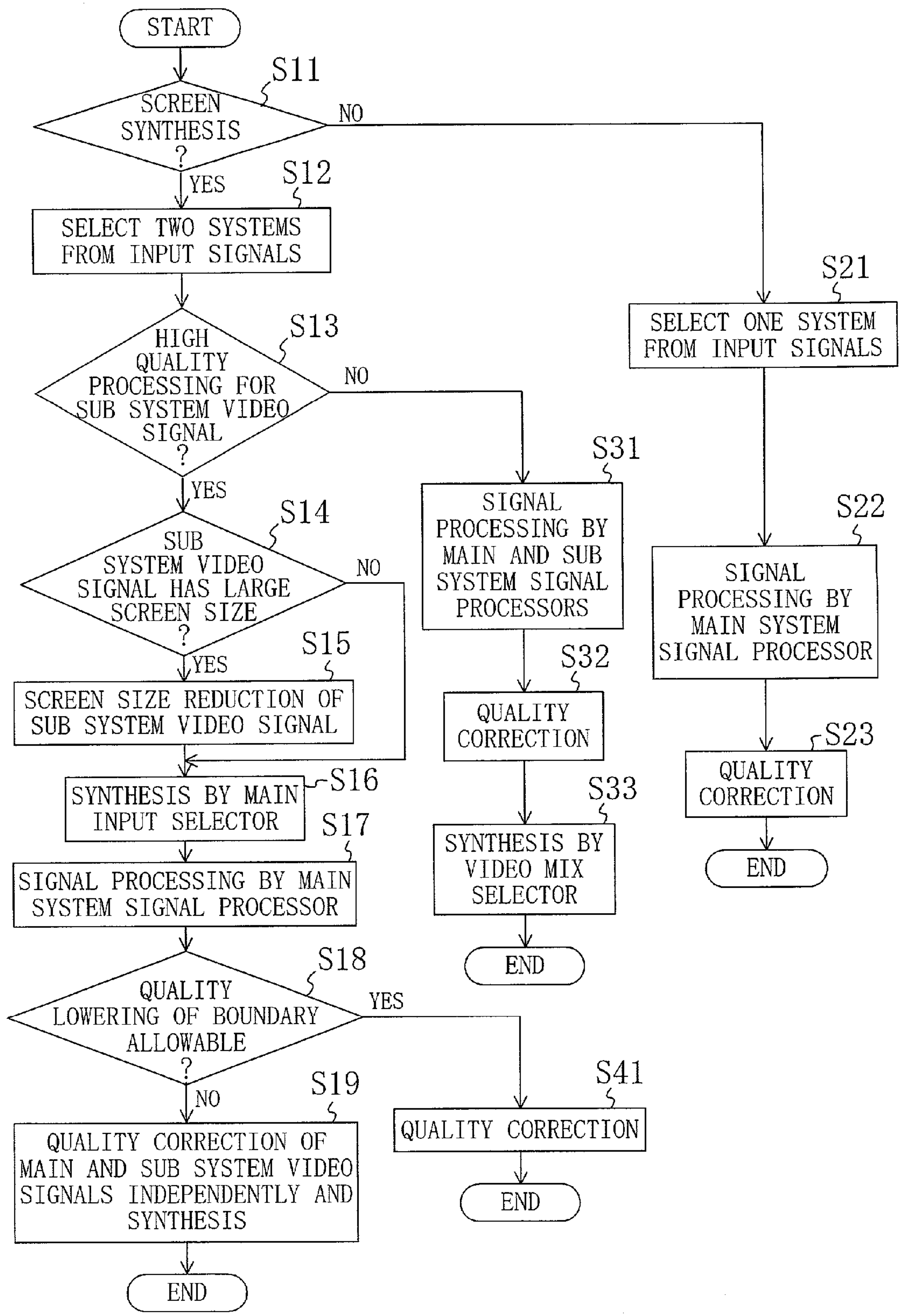
FIG. 22 is a flowchart for showing procedures in processing performed by the video signal processing apparatus of FIG. 17.

FIG. 22 is a flowchart for showing procedures in the processing performed by the video signal processing apparatus of FIG. 17. In step S11, it is determined whether or not the screen synthesis is performed, namely, whether or not input signals are synthesized to obtain multi-screen display. When the screen synthesis is performed, the procedure proceeds to step S12, and when not, the procedure proceeds to step S21. In step S12, video signals of, for example, two systems are selected from the input video signals.

In step S13, it is determined whether or not the sub system video signal is also processed through the IP conversion or the like to attain high quality. When the high quality processing is performed, the procedure proceeds to step S14, and when not, the procedure proceeds to step S31. In step S14, it is determined whether or not the screen size of the sub system video signal is larger than a predetermined size. When the screen size is larger than the predetermined size, the procedure proceeds to step S15, and otherwise, the procedure proceeds to step S16.

In step S15, the screen size of the sub system video signal is reduced. At this point, as described with respect to the video signal processing apparatus of FIG. 11, the inactive sub system signal processor 240 may be effectively used. Thereafter, the main and sub system video signals are synthesized by the main system input selector 21 (step S16), and the resultant signal is subjected to the signal processing such as the IP conversion by the main system signal processor 130 (step S17).

In step S18, it is determined whether or not the lowering in the picture quality on the boundary of the synthesized screen is allowable. When the quality lowering is not allowable, the procedure proceeds to step S19, and otherwise, the procedure proceeds to step S41. In step S19, the picture quality is corrected after separating the main and sub system video signals from each other, and thereafter, the video signals are synthesized again.

On the other hand, in step S21, a video signal of one system is selected from the input video signals. In step S22, the main system signal processor 130 performs the signal processing such as the IP conversion on the selected video signal, and the picture quality is corrected in step S23.

In step S31, the main system signal processor 130 and the sub system signal processor 240 respectively perform the signal processing such as the IP conversion on the main and sub system video signals. In step S32, the processed signals are corrected in the picture qualities, and in step S33, the two signals resulting from the picture quality correction are synthesized.

In step S41, the synthesized screen is corrected in the picture quality without separating the video signals.

In this manner, the video signal processing apparatus of FIG. 17 includes a plurality of signal processing parts, namely, the main system signal processor 130, the sub system signal processor 240, the main system quality corrector 234, the sub system quality corrector 244, the main system horizontal reduction circuit 23 and the sub system horizontal reduction circuit 24, so as to select signal processing parts to be used for the processing of a selected video signal from them and to determine the order of the processing operations of the selected signal processing parts. Such selection and determination can be made depending upon the mode of a video signal to be ultimately obtained as the output, such as whether or not video signals are synthesized to obtain multi-screen display and whether or not high picture quality processing is necessary.

In this manner, according to Embodiment 6, a video signal obtained on the basis of the main system video signal VIM and a video signal obtained on the basis of the sub system video signal VIS are separated from each other. Thereafter, each video signal obtained by the separation is corrected in the picture quality after masking an outside area of the screen of the video signal with a fixed value or a pixel value of the boundary, and then, the resultant signals are synthesized again for screen synthesis. Accordingly, in the case where pixels arranged in the horizontal or vertical direction are used as a tap in the picture quality correction using, for example, the HV enhancer, the lowering of the picture quality in the vicinity of the boundary between the screens can be suppressed.

The video signal processing apparatus of FIG. 17 can perform the same operation as that of the video signal processing apparatus of any of Embodiments 2 through 5 when the order of the processing is changed by appropriately changing the selection in the main system input selector 21, the main system quality correction selector 25 and the sub system quality correction selector 26.

EMBODIMENT 7

Figure 23:
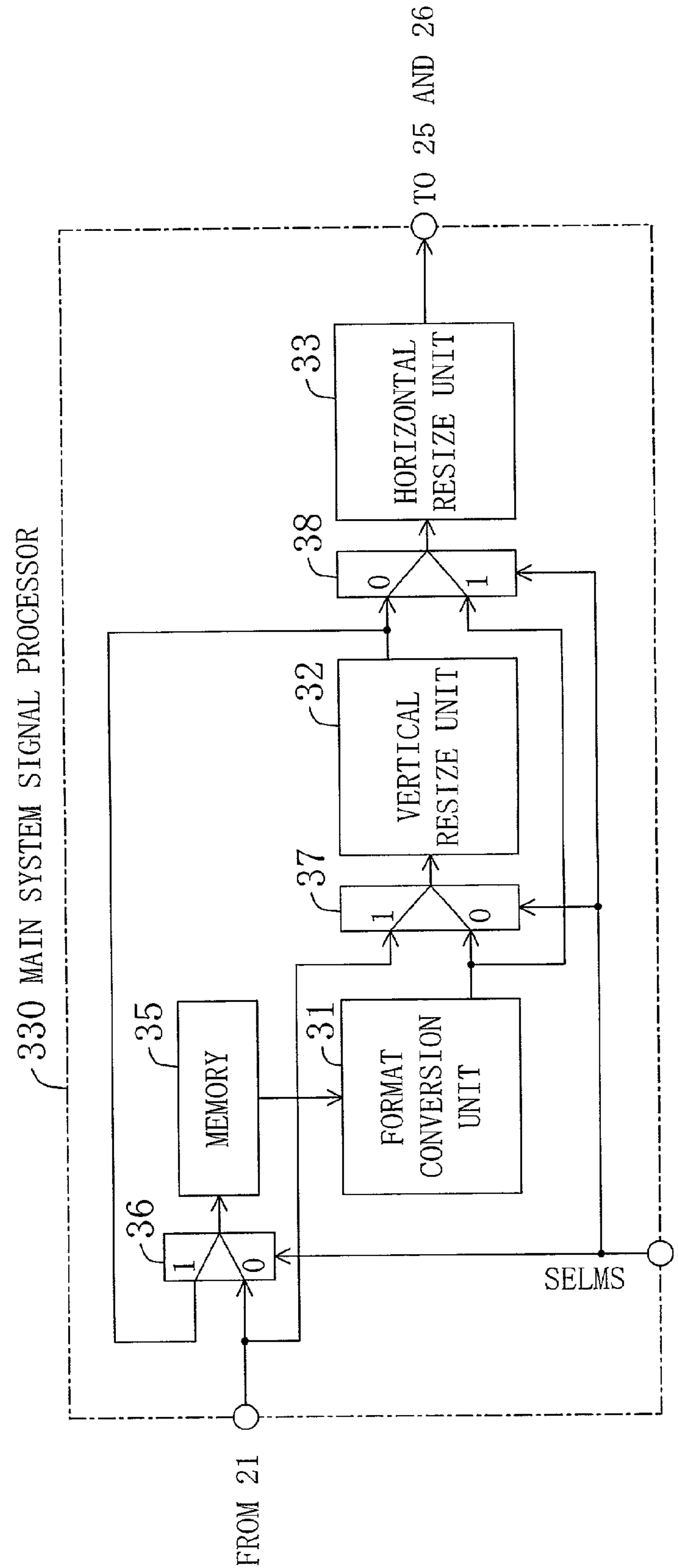
FIG. 23 is a block diagram of a main system signal processor according to Embodiment 7 of the invention.

In Embodiment 7 of the invention, the main system signal processor 130 of the video signal processing apparatus of FIG. 17 is replaced with a main system signal processor 330 shown in FIG. 23. The other composing elements are the same as those described in Embodiment 6 and hence the description is omitted.

FIG. 23 is a block diagram of the main system signal processor 330 of Embodiment 7. The main system signal processor 330 of FIG. 23 includes a format conversion unit 31, a vertical resize unit 32, a horizontal resize unit 33, a memory 35 and selectors 36, 37 and 38.

The selectors 36, 37 and 38 receive a main system signal processing select signal SELMS output from the timing controller (not shown). Each of the selectors 36, 37 and 38 selects and outputs one of the two inputs in accordance with the select signal SELMS.

Although not shown in the drawing, the selector 36 selects, in accordance with the select signal SELMS, a synchronization signal and a clock necessary for the memory 35 and supplies the selected signals to the memory 35. Similarly, the selectors 37 and 38 select synchronization signals and clocks necessary for the vertical resize unit 32 and the horizontal resize unit 33 and supply the selected signals to them. The vertical resize unit 32, the horizontal resize unit 33 and the memory 35 may be supplied with a fast clock if necessary or a clock with a lower frequency than the fast clock. The synchronization signal may be the synchronization signal of one of the video signals selected by the input signal selector 11 or the output synchronization signal SYNO separated from the externally input synchronization signal SCO.

When the select signal SELMS is “1”, the selector 37 selects the video signal input to the main system signal processor 330, and when the select signal SELMS is “0”, it selects the output of the format conversion unit 31, and outputs the selected signal to the vertical resize unit 32. When the select signal SELMS is “1”, the selector 36 selects the output of the vertical resize unit 32, and when the select signal SELMS is “0”, it selects the video signal input to the main system signal processor 330, and outputs the selected signal to the memory 35. The memory 35 stores the received video signal and outputs the stored signal to the format conversion unit 31. When the select signal SELMS is “1”, the selector 38 selects the output of the format conversion unit 31, and when the select signal SELMS is “0”, it selects the output of the vertical resize unit 32, and outputs the selected signal to the horizontal resize unit 33.

Now, the operation of the main system signal processor 330 performed when the select signal SELMS is “1” will be described. First, the video signal output from the main system input selector 21 to the main system signal processor 330 is input to the vertical resize unit 32 through the selector 37. The vertical resize unit 32 converts the number of lines included in one screen of the received video signal so as to match with the number of lines included in one screen of the output video signal VO. Specifically, the vertical resize unit 32 processes the video signal by using the reduction filter and then writes the resultant signal in the memory 35, through the selector 36, with the lines decimated.

When the video signal is an interlaced signal, the memory 35 holds a plurality of fields of written data and outputs, to the format conversion unit 31, the video signal corresponding to a plurality of fields having been reduced in the vertical direction. The format conversion unit 31 performs the IP conversion by using this data corresponding to the plural fields. It goes without saying that when the video signal is not an interlaced signal, the IP conversion is not necessary. The format conversion unit 31 sends its output to the horizontal resize unit 33 through the selector 38. The horizontal resize operation performed at this point is the same as that described above. The horizontal resize unit 33 sends its output to the main system quality correction selector 25 and the sub system quality correction selector 26.

Since the data are written in the memory 35 with the number of vertical lines previously reduced when the select signal SELMS is “1”, the memory capacity can be reduced.

Next, the operation of the main system signal processor 330 performed when the select signal SELMS is “0” will be described. The video signal input to the main system signal processor 330 is input to the memory 35 through the selector 36, and then stored in the memory 35. When the video signal is an interlaced signal, the memory 35 reads data corresponding to a plurality of fields by using the fast clock in synchronization with the output video signal VO, and outputs the read data to the format conversion unit 31. At this point, the data may be read in synchronization with the dummy output horizontal synchronization signal obtained in consideration of the vertical resize as described in Embodiment 1.

The format conversion unit 31 performs the IP conversion by using the data of the plural fields, and outputs the resultant signal to the vertical resize unit 32 through the selector 37. The vertical resize unit 32 converts the number of lines of the received video signal, and outputs the resultant signal to the horizontal resize unit 33 through the selector 38. The horizontal resize unit 33 reads the data by using the output clock while converting the number of pixels included in one line as described with reference to FIG. 9, and outputs the resultant signal to the main system quality correction selector 25 and the sub system quality correction selector 26. In this manner, when the select signal SELMS is “0”, the main system signal processor 330 is operated in the same manner as the main system signal processor 130 described with reference to FIG. 8.

In the case where the screen size of the input video signal is small, namely, in the case where the memory capacity necessary for the format conversion like the IP conversion is smaller than the capacity of the memory 35, the timing controller sets the main system signal processing select signal SELMS to “0”, so as to make the main system signal processor perform a general operation. On the other hand, in the case where the screen size of the input video signal is large, namely, in the case where the necessary memory capacity is larger than the capacity of the memory 35, the timing controller sets the select signal SELMS to “1”, so that the processing like IP conversion can be performed after previously converting the number of lines included in one screen of the input video signal into the number of lines included in one screen of the output video signal VO.

The main system signal processor 130 according to any of Embodiments 2 through 5 may be replaced with the main system signal processor 330 of FIG. 23.

Figure 24:
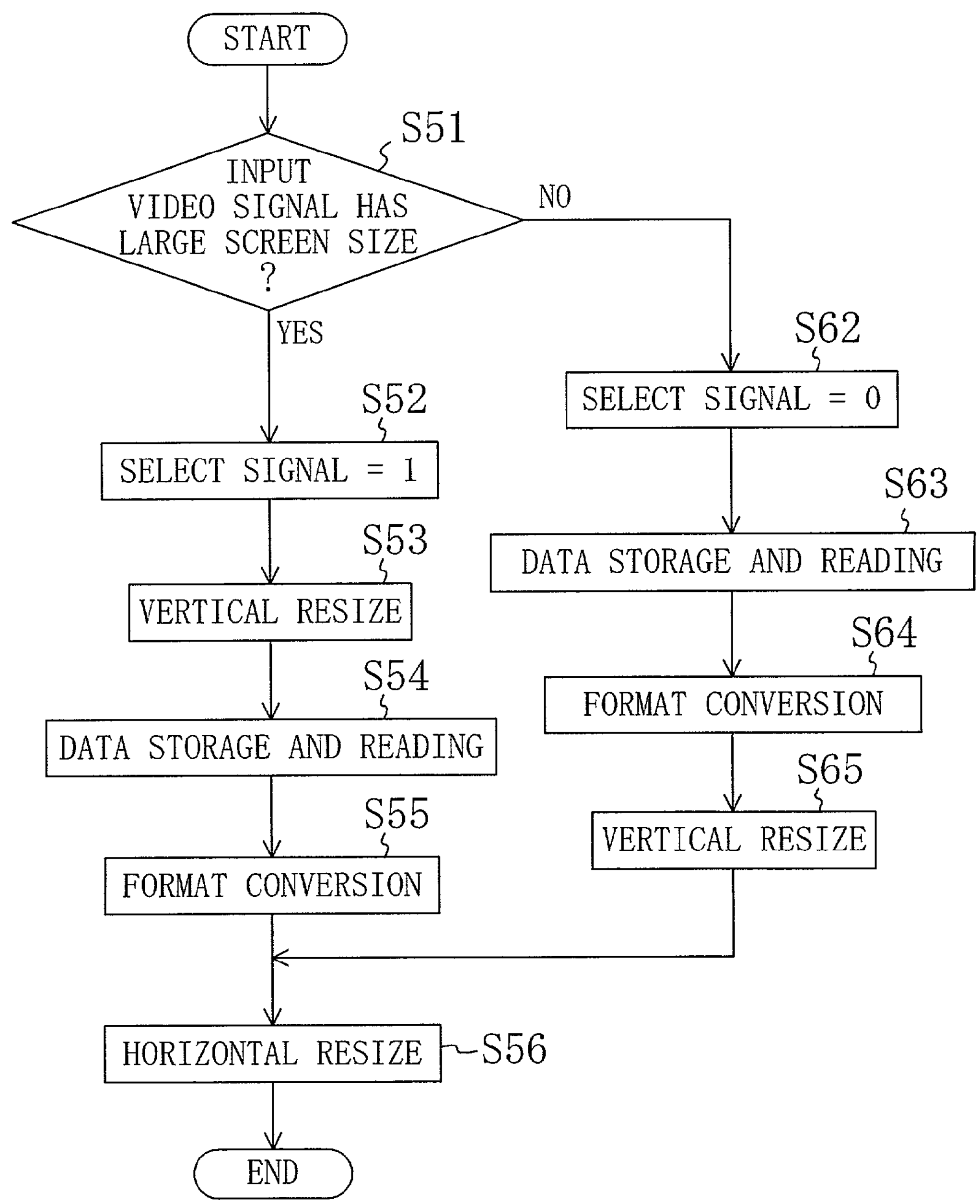
FIG. 24 is a flowchart for showing procedures in processing performed by the main system signal processor of FIG. 23.

FIG. 24 is a flowchart for showing procedures in the processing performed by the main system signal processor 330 of FIG. 23. In step S51, it is determined whether or not the screen size of the input video signal is large, namely, whether or not the memory capacity necessary for the format conversion like the IP conversion is larger than the capacity of the memory 35. When the screen size is large, the procedure proceeds to step S52, and otherwise, the procedure proceeds to step S62.

In step S52, the select signal SELMS is set to “1”. Thereafter, the processing are performed in the order of the vertical resize (step S53), the data storage in the memory and the data reading (step S54), the format conversion (step S55) and the horizontal resize (step S56).

In step S62, the select signal SELMS is set to “0”. Thereafter, the processing are performed in the order of the data storage in the memory and the data reading (step S63), the format conversion (step S64), the vertical resize (step S65) and the horizontal resize (step S56).

In this manner, when the main system signal processor 330 of FIG. 23 is used in the video signal processing apparatus of FIG. 17, the order of the processing operations of the signal processing parts, namely, the format conversion unit 31, the vertical resize unit 32, the horizontal resize unit 33 and the memory 35, can be determined in accordance with the format of an input video signal.

As described above, according to Embodiment 7, the order of the processing operations of the respective signal processing parts of the main system signal processor can be changed in accordance with the screen size of an input video signal. Therefore, in the case where the number of lines included in one screen of the input video signal is large, the lines can be previously reduced before writing the signal in the memory. Accordingly, a system coping with a large number of video signal formats can be constructed without increasing the capacity of the memory.

EMBODIMENT 8

Figure 25:
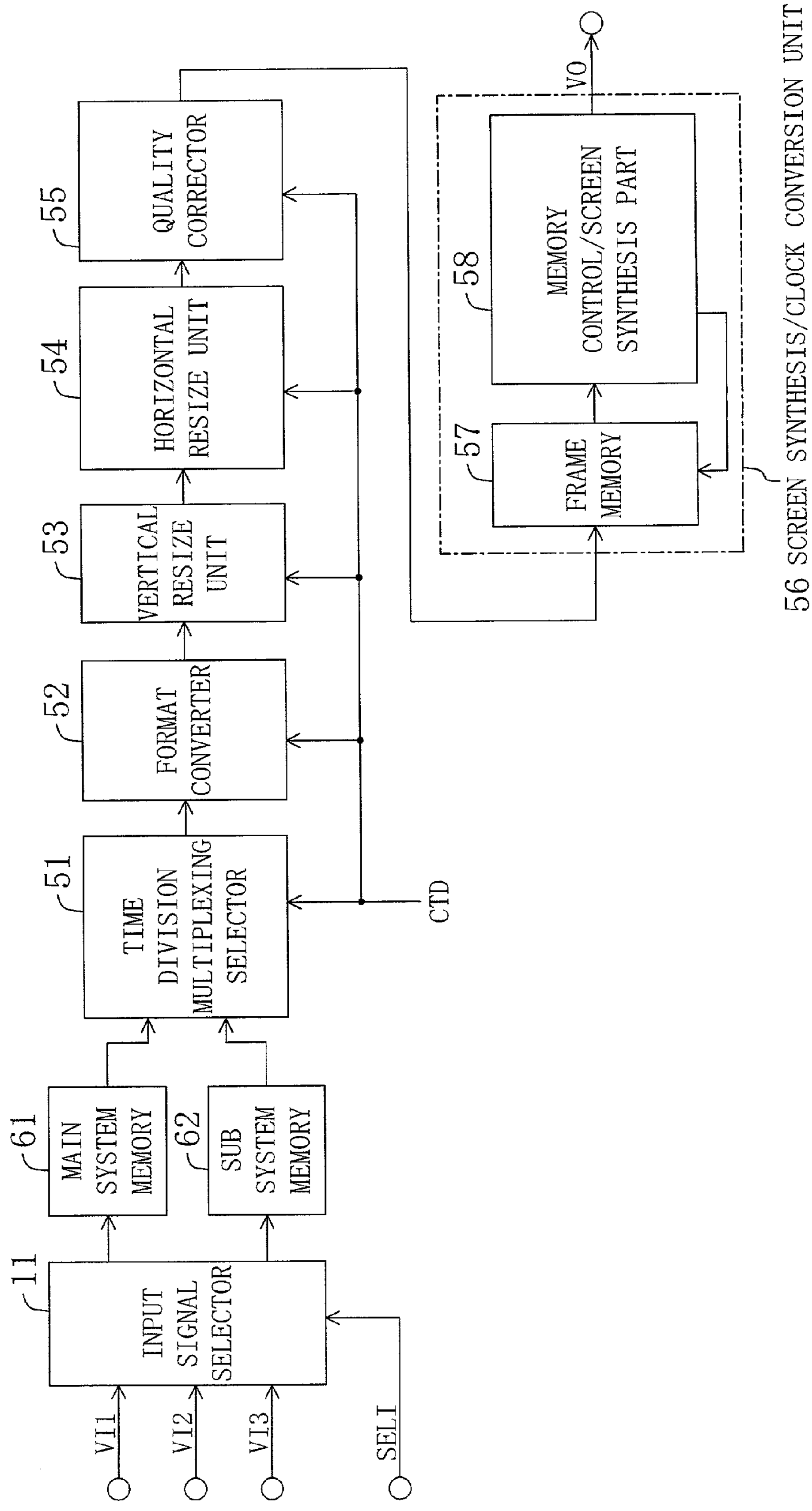
FIG. 25 is a block diagram of a video signal processing apparatus according to Embodiment 8 of the invention.

FIG. 25 is a block diagram of a video signal processing apparatus according to Embodiment 8 of the invention. The video signal processing apparatus of FIG. 25 includes an input signal selector 11, a main system memory 61, a sub system memory 62, a time division multiplexing selector 51, a format converter 52, a vertical resize unit 53, a horizontal resize unit 54, a quality corrector 55 and a screen synthesis/clock conversion unit 56. The time division multiplexing selector 51, the format converter 52, the vertical resize unit 53, the horizontal resize unit 54 and the quality corrector 55 are operated in synchronization with one another in accordance with a time division multiplexing control signal CTD.

The input signal selector 11 selects a main system video signal and a sub system video signal from input video signals, and writes the selected video signals in the main system memory 61 and the sub system memory 62, respectively. The main system memory 61 and the sub system memory 62 perform the reading operation by using a fast clock CLF, and output the read video signals to the time division multiplexing selector 51.

Figure 26:
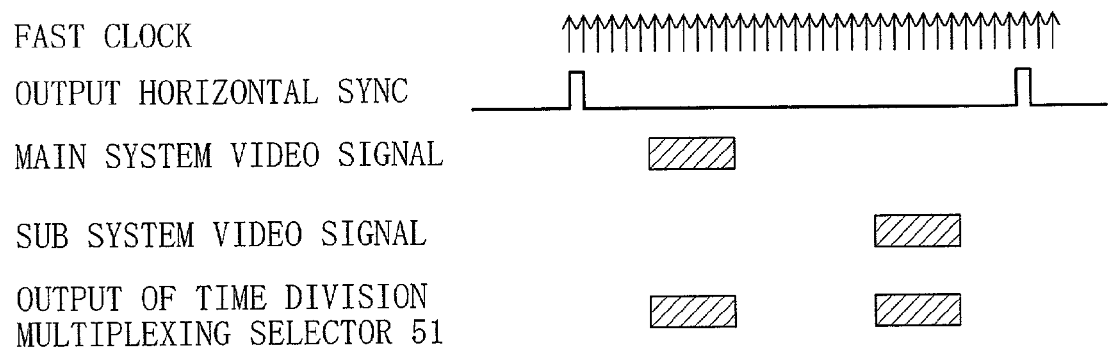
FIG. 26 is an explanatory diagram for showing time division multiplexing of a video signal.

FIG. 26 is an explanatory diagram for showing the time division multiplexing of the video signals. Since the reading operations of the main system memory 61 and the sub system memory 62 are in synchronization with the same synchronization signal, the read main and sub system video signals are in synchronization with each other. At this point, for example, in the case where a main system screen is displayed in a left area of the display and a sub system screen is displayed in a right area of the display, the main system video signal and the sub system video signal are read in this order after the horizontal synchronization signal of the output video signal VO as shown in FIG. 26. The time division multiplexing selector 51 selects one of the outputs of the main system memory 61 and the sub system memory 62 on the basis of the time division multiplexing control signal CTD, so as to output, to the format converter 52, a video signal obtained by time division multiplexing the main system video signal and the sub system video signal.

The format converter 52, the vertical resize unit 53, the horizontal resize unit 54 and the quality corrector 55 disposed at the following stages receive this time division multiplexed video signal and perform predetermined processing on the main system video signal and the sub system video signal in synchronization with the time division multiplexing control signal CTD. The processing performed by the format converter 52, the vertical resize unit 53, the horizontal resize unit 54 and the quality corrector 55 are the same as those described in Embodiments 1 through 7, and hence the detailed description is omitted.

The processing performed on the main system video signal and the sub system video signal may be the same or different with a different parameter or the like. The quality corrector 55 performs filtering processing on the received video signal and outputs the resultant signal to the screen synthesis/clock conversion unit 56.

Figure 27A:
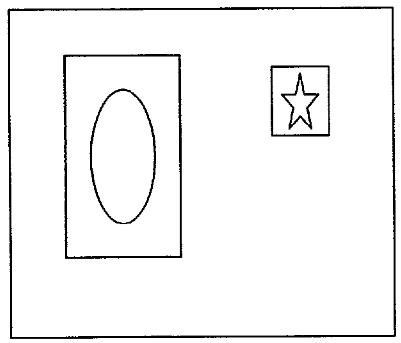
FIGS. 27A and 27B are explanatory diagrams of input/output signals of a screen synthesis/clock conversion unit.
Figure 27B:
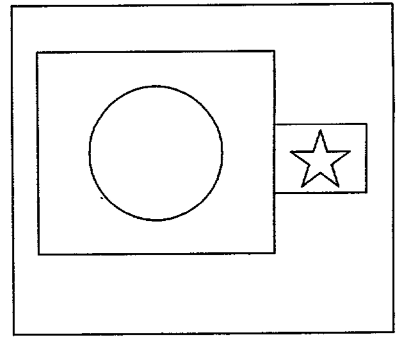

FIGS. 27A and 27B are explanatory diagrams for showing examples of an input/output signal of the screen synthesis/clock conversion unit 56. The screen synthesis/clock conversion unit 56 includes a frame memory 57 and a memory control/screen synthesis part 58. The frame memory 57 stores the received video signal. FIG. 27A shows an example of the screen corresponding to the video signal input to the frame memory 57. The memory control/screen synthesis part 58 reads the data from the frame memory 57 by using the output clock CLO while controlling the reading address for the screen synthesis, and outputs the read data as the output video signal VO. FIG. 27B shows an example of the screen corresponding to the output video signal VO output by the memory control/screen synthesis part 58 when the signal of FIG. 27A is input to the frame memory 57.

In this manner, according to Embodiment 8, the main system video signal and the sub system video signal necessary for generating the output video signal are previously time division multiplexed, and the thus obtained video signal of one system is subjected to the predetermined processing. Since there is no need to provide circuits for performing video signal processing respectively on the main system video signal and the sub system video signal, the circuit scale can be largely reduced.

The time division multiplexing for arranging two screens in the horizontal direction is employed in this embodiment, which does not limit the invention. Also, although the two signals, namely, the main system video signal and the sub system video signal, are subjected to the time division multiplexing in this embodiment, three or more signals may be subjected to the time division multiplexing. It goes without saying that the effect to reduce the circuit scale can be more remarkable when a larger number of video signals are multiplexed.

In each of the aforementioned embodiments, the description is made on the assumption that the input video signals are three systems, that each of the main system video signal and the sub system video signal is one system and that the output video signal is one system. The input video signals may be four or more systems and the sub system video signal may be two or more systems. In other words, the video signal processing apparatus of this invention receives, as inputs, video signals of n systems (wherein n is a natural number), from which one system is selected as a main system video signal and (m−1) systems (wherein m is a natural number smaller than n) are selected as sub system video signals, so that the output video signal may be generated to be output on the basis of the selected video signals of m systems. In this case, each of the sub system signal processor, the sub system quality corrector, the sub system horizontal reduction circuit and the like should be m−1 in number.

Also, although the output synchronization signal is externally input in each embodiment, the same effect can be attained by using the synchronization signal of one of the input video signals so as to synchronize the other signals with this synchronization signal. Although the dummy output synchronization signal used for the vertical resize processing in the vertical resize unit is generated from the output synchronization signal in the embodiment, the dummy output synchronization signal may be externally input or may be supplied by the timing controller.

The internal structures of the main system signal processor and the sub system signal processor are not limited those described in the aforementioned embodiments but any other structure may be employed as far as the same signal processing can be performed. Also, the order of the processing may be different. Furthermore, the content of the signal processing performed by the quality corrector is not limited to that described in the embodiment.

As described so far, according to the invention, a limited number of circuits and limited memory capacities can be maximally utilized since the processing order is changed by switching the connection among circuits for performing the signal processing in accordance with the formats of input video signals and the necessary mode of an output video signal. As a result, a video signal processing apparatus capable of coping with a larger number of kinds of video signal formats can be realized.

What is claimed is:

1. A video signal processing method employed in a video signal processing apparatus that includes a plurality of signal processing parts, each for executing signal processing, for processing two or more digitalized video signals in parallel, comprising the steps of:

selecting one or more video signals from said two or more digitalized video signals; and obtaining an object video signal by selecting, from said plurality of signal processing parts, signal processing parts used for signal processing of said selected video signals in accordance with a mode of said object video signal and performing said signal processing in said selected signal processing parts in an order in accordance with said mode of said object video signal, wherein said video signal processing apparatus includes, as said plurality of signal processing parts, a signal processing part for performing signal processing on the basis of a clock having a higher frequency than a clock of said video signal input to said video signal processing apparatus.

2. A video signal processing method employed in a video signal processing apparatus that includes a plurality of signal processing parts, each for executing signal processing, for processing two or more digitalized video signals in parallel, comprising the steps of:

selecting one or more video signals from said two or more digitalized video signals; and obtaining an object video signal by selecting, from said plurality of signal processing parts, signal processing parts used for signal processing of said selected video signals in accordance with a mode of said object video signal and performing said signal processing in said selected signal processing parts in an order in accordance with said mode of said object video signal, wherein said video signal processing apparatus includes, as said plurality of signal processing parts, a signal processing part that performs signal processing without using said clock.

3. A video signal processing apparatus that receives, as input video signals, a plurality of digitalized video signals and outputs an output video signal generated on the basis of video signal selected from said input video signals, comprising:

an input signal selection unit for selecting, from said plurality of input video signals, one video signal as a main system video signal and another video signal as a sub system video signal and outputting said selected video signals;

a main system signal processor for receiving said main system video signal, performing video signal processing by using a clock having a frequency higher than a clock frequency of said main system video signal and outputting a resultant video signal as an output thereof in synchronization with a synchronization signal of said output video signal;

a sub system signal processor for receiving said sub system video signal, performing video signal processing by using a clock having a frequency higher than a clock frequency of said sub system video signal and outputting a resultant video signal as an output thereof in synchronization with said synchronization signal of said output video signal;

a timing controller for receiving said synchronization signal of said output video signal and outputting an output select signal in synchronization with said synchronization signal of said output video signal; and a screen synthesis unit for receiving the outputs of said main system signal processor and said sub system signal processor and outputting said output video signal, in which screens are synthesized, through selection in accordance with said output select signal.

4. A video signal processing apparatus that receives, as input video signals, a plurality of digitalized video signals and outputs an output video signal generated on the basis of video signal selected from said input video signals, comprising:

an input signal selection unit for selecting, from said plurality of input video signals, one video signal as a main system video signal and another video signal as a sub system video signal and outputting said selected video signals;

a main system signal processor for receiving said main system video signal, performing video signal processing by using a clock having a frequency higher than a clock frequency of said main system video signal and outputting a resultant signal as an output thereof;

a main system quality corrector for performing picture quality correction on the output of said main system signal processor and outputting a resultant video signal as an output thereof;

a sub system signal processor for receiving said sub system video signal, performing video signal processing and outputting a resultant signal as an output thereof;

a sub system quality corrector for performing picture quality correction on the output of said sub system signal processor and outputting a resultant video signal as an output thereof;

a timing controller for receiving a synchronization signal of said output video signal and outputting an output select signal in synchronization with said synchronization signal of said output video signal; and a screen synthesis unit for receiving the outputs of said main system quality corrector and said sub system quality corrector and outputting said output video signal, in which screens are synthesized, through selection in accordance with said output select signal.

5. The video signal processing apparatus of claim 4, further comprising a main system video selection unit for selecting and outputting one of the outputs of said main system video signal processor and said sub system video signal processor, wherein said main system signal processor receives, instead of said main system video signal, an output of said main system video selection unit.

6. The video signal processing apparatus of claim 5, wherein said sub system signal processor outputs the output thereof in synchronization with a synchronization signal of said main system video signal, said main system video selection unit performs selection of video signals input thereto at timing synchronized with said synchronization signal, performs screen synthesis and outputs a resultant signal as an output thereof.

7. The video signal processing apparatus of claim 5, wherein said main system video selection unit includes:

multipliers, respectively corresponding to video signals input thereto, for obtaining and outputting a product of each video signal input thereto and a gain of said video signal;

an adder for adding outputs of said multipliers and outputting a sum as an output thereof; and a selector for selecting and outputting one of a plurality of video signals input to said main system video selection unit and the output of said adder, said selector is used for changing timing of said selection with respect to a synchronization signal of said main system video signal, and said gains used in said multipliers are changed with substantially constantly keeping a sum thereof.

8. The video signal processing apparatus of claim 5, further comprising:

a main system horizontal reduction circuit for receiving said main system video signal, changing a number of pixels included in one line of a screen corresponding to said main system video signal to one or less time and outputting a resultant signal as an output thereof; and a sub system horizontal reduction circuit for receiving said sub system video signal, changing a number of pixels included in one line of a screen corresponding to said sub system video signal to one or less time and outputting a resultant signal as an output thereof, wherein said main system video selection unit receives, instead of said main system video signal, the output of said main system horizontal reduction circuit, and said sub system signal processor receives, instead of said sub system video signal, the output of said sub system horizontal reduction circuit.

9. The video signal processing apparatus of claim 8, wherein at least one of said main system horizontal reduction circuit and said sub system horizontal reduction circuit reduces the number of pixels included in one line of a screen corresponding to said video signal input thereto.

10. The video signal processing apparatus of claim 6, further comprising:

a main system quality correction selection unit for selecting one of the output of said main system signal processor and the output of said sub system signal processor and outputting said selected output; and a sub system quality correction selection unit for selecting one of the output of said main system signal processor and the output of said sub system signal processor and outputting said selected output, wherein said main system quality corrector receives, instead of the output of said main system signal processor, the output of said main system quality correction selection unit, said sub system quality corrector receives, instead of the output of said sub system signal processor, the output of said sub system quality correction selection unit, when said main system quality correction selection unit and said sub system quality correction selection unit both select the output of said main system signal processor, said main system quality corrector separates, from said video signal input thereto, a signal obtained on the basis of said main system video signal, performs picture quality correction on a screen corresponding to said separated signal and outputs a resultant signal as the output, and said sub system quality corrector separates, from said video signal input thereto, a signal obtained on the basis of said sub system video signal, performs the picture quality correction on a screen corresponding to said separated signal and outputs a resultant signal as the output.

11. The video signal processing apparatus of claim 10, wherein said main system quality corrector performs the picture quality correction on said screen corresponding to said signal obtained on the basis of said main system video signal with pixel values of pixels outside of said screen set to a given value, and said sub system quality corrector performs the picture quality correction on said screen corresponding to said signal obtained on the basis of said sub system video signal with pixel values of pixels outside of said screen set to a given value.

12. The video signal processing apparatus of claim 10, wherein said main system quality corrector performs the picture quality correction on said screen corresponding to said signal obtained on the basis of said main system video signal with pixel values of pixels disposed on an edge corresponding to a boundary of said screen used as pixel values of pixels in a region outside of said screen and adjacent to said edge, and said sub system quality corrector performs the picture quality correction on said screen corresponding to said signal obtained on the basis of said sub system video signal with pixel values of pixels disposed on an edge corresponding to a boundary of said screen used as pixel values of pixels in a region outside of said screen and adjacent to said edge.

13. The video signal processing apparatus of claim 4, wherein said sub system signal processor includes a vertical resize frame synchronization part for performing conversion of a number of lines included in one screen corresponding to said video signal input thereto and outputting a resultant signal in synchronization with said synchronization signal of said output video signal.

14. The video signal processing apparatus of claim 3 or 4, wherein each of said main system signal processor and said sub system signal processor includes a memory for storing a video signal, and a size and a position of a screen corresponding to each of said video signals is changed by changing timing of reading from said memory and timing of selection by said screen synthesis unit.

15. The video signal processing apparatus of claim 3 or 4, wherein said video synthesis unit includes:

multipliers, respectively corresponding to video signals input thereto, for obtaining and outputting a product of each video signal input thereto and a gain of said video signal;

an adder for adding outputs of said multipliers and outputting a sum as an output thereof and a selector for selecting one of a plurality of video signals input to said main system video selection unit and the output of said adder, and said selector is used for changing timing of said selection with respect to a synchronization signal of said main system video signal, and said gains used in said multipliers are changed with substantially constantly keeping a sum thereof.

16. The video signal processing apparatus of claim 3 or 4, wherein said main system signal processor includes a format conversion unit, a vertical resize unit and a horizontal resize unit, said format conversion unit converts a format of a video signal input thereto, said vertical resize unit converts a number of lines included in one screen corresponding to a video signal input thereto, and said horizontal resize unit converts a number of pixels included in one line of a screen corresponding to a video signal input thereto.

17. The video signal processing apparatus of claim 16, wherein said main system signal processor includes selectors respectively for selecting inputs to said format conversion unit, said vertical resize unit and said horizontal resize unit, and an order of processing in said format conversion unit, said vertical resize unit and said horizontal resize unit is changed by switching inputs to said selectors.

* * * * *